US011036339B2

(12) United States Patent
Kim et al.

(10) Patent No.: US 11,036,339 B2
(45) Date of Patent: Jun. 15, 2021

(54) TOUCH SENSOR INTEGRATED DISPLAY DEVICE AND METHOD FOR DRIVING THE SAME

(71) Applicant: LG DISPLAY CO., LTD., Seoul (KR)

(72) Inventors: Taegung Kim, Paju-si (KR); Kyungrok Kim, Paju-si (KR); Juyoung Noh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 21 days.

(21) Appl. No.: 16/038,890

(22) Filed: Jul. 18, 2018

(65) Prior Publication Data
US 2019/0079606 A1 Mar. 14, 2019

(30) Foreign Application Priority Data
Sep. 13, 2017 (KR) .......................... 10-2017-0117460

(51) Int. Cl.
G06F 3/044 (2006.01)
G06F 3/041 (2006.01)
G09G 3/3275 (2016.01)
G09G 3/3266 (2016.01)
G09G 3/3233 (2016.01)
G09G 3/3291 (2016.01)

(52) U.S. Cl.
CPC ............ *G06F 3/044* (2013.01); *G06F 3/0412* (2013.01); *G06F 3/04166* (2019.05); *G09G 3/3233* (2013.01); *G09G 3/3266* (2013.01); *G09G 3/3275* (2013.01); *G09G 3/3291* (2013.01); *G09G 2300/0861* (2013.01); *G09G 2310/08* (2013.01); *G09G 2354/00* (2013.01)

(58) Field of Classification Search
CPC ...... G06F 3/0412; G06F 3/0416; G06F 3/044; G06F 3/04166; G09G 3/3233; G09G 3/3291; G09G 3/3275; G09G 3/3266; G09G 2354/00; G09G 2300/0861; G09G 2310/08
See application file for complete search history.

(56) References Cited
U.S. PATENT DOCUMENTS 8,289,285 B2 * 10/2012 Jang ..................... G09G 3/3648
345/173
8,537,126 B2 * 9/2013 Yousefpor ............. G06F 3/0443
345/173
8,692,180 B2 * 4/2014 Oh ......................... G06F 3/0418
250/214 R (Continued)

FOREIGN PATENT DOCUMENTS
KR 10-2017-0020684 A 2/2017

*Primary Examiner* — Michael J Jansen, II
(74) *Attorney, Agent, or Firm* — Birch, Stewart, Kolasch & Birch, LLP

(57) ABSTRACT

A touch sensor-integrated display device includes a display panel with a pixel array divided into a plurality of touch blocks, each touch block having a plurality of pixels for displaying an input image and at least one touch pixel for sensing touch input; a data drive circuit that applies a charging voltage to the touch pixel in each touch block through a touch sensing line and then senses an electrical charge discharged from the touch pixel and outputs the sensing result as a touch sensing value, wherein a signal line commonly connected to the pixels and the touch pixel in each touch block is used as the touch sensing line; and a timing controller that detects touch input based on the touch sensing value.

16 Claims, 20 Drawing Sheets

(56) References Cited

U.S. PATENT DOCUMENTS

| | | | |
|---|---|---|---|
| 8,760,412 B2* | 6/2014 | Hotelling | G06F 3/0445 345/173 |
| 8,773,393 B2* | 7/2014 | Cok | G06F 3/0446 345/174 |
| 8,922,521 B2* | 12/2014 | Hotelling | G06F 3/04164 345/174 |
| 8,933,898 B2* | 1/2015 | Lee | G06F 3/044 345/173 |
| 9,058,072 B2* | 6/2015 | Bae | G06F 3/041 |
| 9,086,774 B2* | 7/2015 | Hotelling | G06F 3/0412 |
| 9,318,540 B2* | 4/2016 | Qing | G06F 3/044 |
| 9,927,930 B2* | 3/2018 | Lee | G02F 1/13338 |
| 9,952,694 B2* | 4/2018 | Kim | G06F 3/04166 |
| 10,025,437 B2* | 7/2018 | Cho | G06F 3/044 |
| 10,055,057 B2* | 8/2018 | Kim | G06F 3/0443 |
| 10,185,431 B2* | 1/2019 | Kim | G06F 3/04166 |
| 10,241,606 B2* | 3/2019 | Abe | G06F 3/044 |
| 10,372,251 B2* | 8/2019 | Abe | G06F 3/04166 |
| 10,534,472 B2* | 1/2020 | Wang | G06F 3/044 |
| 10,620,731 B2* | 4/2020 | Lee | G09G 3/3225 |
| 2010/0026636 A1* | 2/2010 | Jang | G02F 1/13338 345/173 |
| 2010/0194695 A1* | 8/2010 | Hotelling | G06F 3/0412 345/173 |
| 2010/0194698 A1* | 8/2010 | Hotelling | G06F 1/3218 345/173 |
| 2010/0253638 A1* | 10/2010 | Yousefpor | G06F 3/04166 345/173 |
| 2012/0235691 A1* | 9/2012 | Ho | G06F 3/0443 324/658 |
| 2012/0249444 A1* | 10/2012 | Lee | G02F 1/13338 345/173 |
| 2013/0135249 A1* | 5/2013 | Chen | G06F 3/0416 345/174 |
| 2013/0342478 A1* | 12/2013 | Bae | G06F 3/041 345/173 |
| 2014/0132534 A1* | 5/2014 | Kim | G06F 3/0412 345/173 |
| 2015/0053947 A1* | 2/2015 | Qing | H01L 27/3265 257/40 |
| 2016/0085363 A1* | 3/2016 | Azumi | G09G 3/3655 345/173 |
| 2016/0092027 A1* | 3/2016 | Lee | G06F 3/044 345/174 |
| 2016/0216800 A1* | 7/2016 | Cho | G06F 3/044 |
| 2017/0031485 A1* | 2/2017 | Kim | G09G 3/3233 |
| 2017/0038898 A1* | 2/2017 | Kim | G09G 3/3233 |
| 2017/0046006 A1* | 2/2017 | Kim | G09G 3/3266 |
| 2017/0139539 A1* | 5/2017 | Yao | G06F 3/0418 |
| 2017/0344145 A1* | 11/2017 | Lo | G06F 3/044 |
| 2017/0351378 A1* | 12/2017 | Wang | G06F 3/0416 |
| 2018/0024677 A1* | 1/2018 | Kim | G06F 3/0412 345/173 |
| 2018/0120995 A1* | 5/2018 | Lee | H01L 27/323 |
| 2018/0150163 A1* | 5/2018 | Lee | G06F 3/042 |
| 2018/0173923 A1* | 6/2018 | Lee | G06K 9/0002 |
| 2018/0292932 A1* | 10/2018 | Cho | G06F 3/0445 |
| 2018/0364845 A1* | 12/2018 | Lee | G06F 3/0443 |
| 2019/0034015 A1* | 1/2019 | Abe | G06F 3/0412 |
| 2019/0079606 A1* | 3/2019 | Kim | G06F 3/04166 |
| 2019/0171323 A1* | 6/2019 | Abe | G06F 3/0412 |
| 2020/0026406 A1* | 1/2020 | Choi | G06F 3/04184 |

* cited by examiner

TOUCH SENSOR INTEGRATED DISPLAY DEVICE AND METHOD FOR DRIVING THE SAME

This application claims the priority benefit of Korean Patent Application No. 10-2017-0117460 filed on Sep. 13, 2017 in the Republic of Korea, which is incorporated herein by reference for all purposes as if fully set forth herein.

BACKGROUND OF THE INVENTION

Field of the Invention

The present invention relates to a touch sensor-integrated display device and a method for driving the same.

Related Art

Touch sensor technology is used to allow users to input information by directly touching the screen with a finger or pen or moving it near the screen while viewing the display devices of home appliances or information and communication equipment. Touch sensors are simple to use, have less malfunctions, and enable the user to input data without using an input device. In addition, the touch sensor can be applied to various display devices because it enables the user to operate it quickly and easily through contents displayed on the screen.

Touch sensors can be implemented by well-known technologies like capacitive touch sensing and infrared (IR) touch sensing.

Capacitive touch sensing can be classified into add-on touch sensing, on-cell touch sensing, and in-cell touch sensing.

In the add-on touch sensing, a display device and a touch film having a touch sensor are separately manufactured, and the touch film is attached onto the surface of the display device. An add-on type touch sensor has an increased thickness structure because a completed touch film is mounted on the display device and has low visibility due to the low brightness of the display device.

In the on-cell touch sensing, a touch sensor is directly formed on the surface of an upper glass substrate of a display device. In the on-cell touch sensing, a touch sensor is formed on the upper surface of the display device and therefore has a smaller thickness than the add-on type, but still has the problem of the increased overall thickness due to the driving electrode layer and sensing electrode layer of the touch sensor and an insulation layer for insulating them. Thus, the number of processes and the manufacturing costs can be increased.

In the in-cell touch sensing, a touch sensor is formed inside the display device, and is attracting attention because it can be made thin. Known examples of in-cell type touch sensors are mutual capacitance touch sensors and self-capacitance touch sensors. In the mutual capacitance sensing, driving electrode lines and sensing electrode lines intersect each other within a display panel to form touch sensors, a touch driving signal is applied to the driving electrode lines, and then touch input is sensed by detecting a change in mutual capacitance at the touch sensors through the sensing electrode lines. In the self-capacitance sensing, touch electrodes and sensor lines are formed on the display panel, a touch driving signal is applied to the touch electrodes through the sensor lines, and touch input is sensed by detecting a change in self-capacitance at the touch electrodes.

The in-cell type touch sensor too requires touch-related signal lines (e.g., driving electrode lines, sensing electrode lines, and sensor lines) to be added to the display panel. Moreover, the in-cell type touch sensor is problematic in that a large parasitic capacitance is formed due to coupling between touch sensors and pixels. This leads to a reduction in touch sensitivity and touch recognition accuracy.

As seen from above, the conventional touch sensor technology requires complicated elements for touch sensing to be added to a display device, which complicates the manufacturing process, increases the manufacturing costs, and lowers touch sensing capabilities, thus making this technology hardly applicable to large-sized models.

SUMMARY OF THE INVENTION

An aspect of the present disclosure is to provide a touch sensor-integrated display device which can minimize additional elements for touch sensing and enhance touch sensing capabilities.

Technical problems to be addressed by the embodiments of the present invention are not limited to the above-mentioned technical problems, and other technical problems not mentioned herein can be clearly understood by those skilled in the art from description below.

An exemplary embodiment of the present invention provides a touch sensor-integrated display device comprising a display panel with a pixel array divided into a plurality of touch blocks, each touch block having a plurality of pixels for displaying an input image and at least one touch pixel for sensing touch input; a data drive circuit that applies a charging voltage to the touch pixel in each touch block through a touch sensing line and then senses an electrical charge discharged from the touch pixel and outputs the sensing result as a touch sensing value; and a timing controller that detects touch input based on the touch sensing value, wherein a signal line commonly connected to the pixels and the touch pixel in each touch block is used as the touch sensing line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF EXEMPLARY EMBODIMENTS

Figure 1:
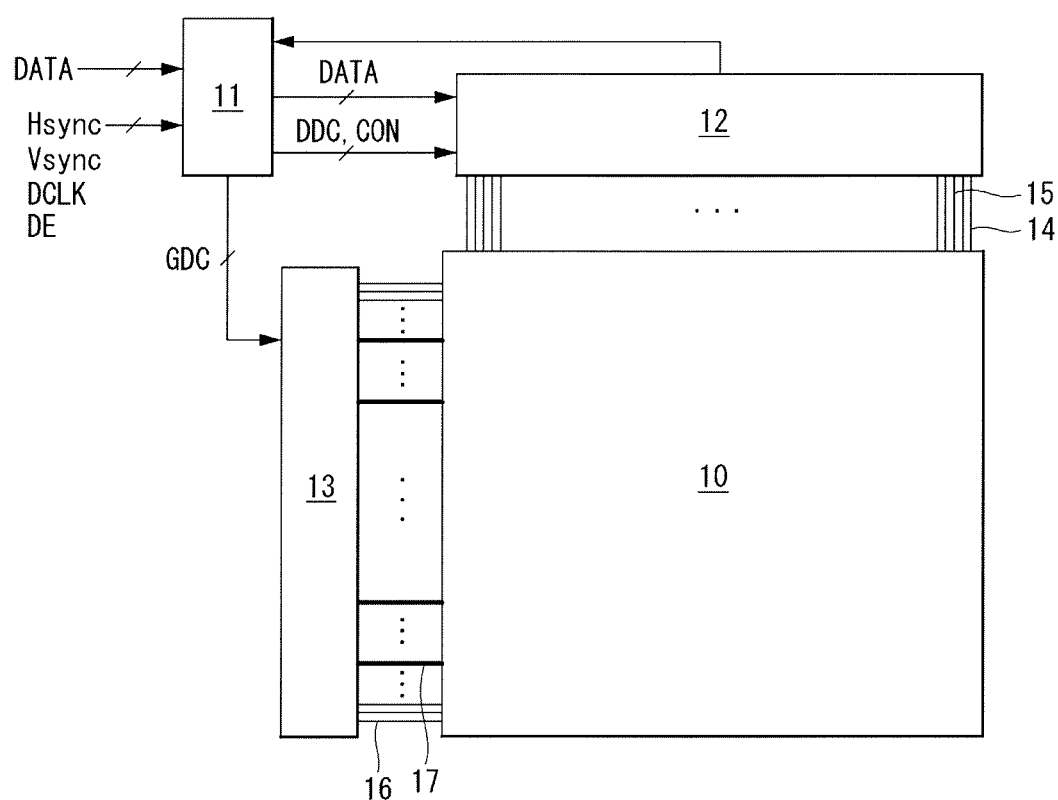
FIG. 1 is a view showing a touch sensor-integrated display device according to an exemplary embodiment of the present invention.

Various aspects and features of the present invention and methods of accomplishing them can be understood more readily by reference to the following detailed descriptions of exemplary embodiments and the accompanying drawings. The present invention can, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims.

The shapes, sizes, proportions, angles, numbers, etc. shown in the figures to describe the exemplary embodiments of the present invention are merely examples and not limited to those shown in the figures. Like reference numerals denote like elements throughout the specification. In describing the present invention, detailed descriptions of related well-known technologies will be omitted to avoid unnecessary obscuring the present invention. When the terms 'comprise', 'have', 'consist of' and the like are used, other parts can be added as long as the term 'only' is not used. The singular forms can be interpreted as the plural forms unless explicitly stated.

The elements can be interpreted to include an error margin even if not explicitly stated.

When the position relation between two parts is described using the terms "on", "over", "under", "next to" and the like, one or more parts can be positioned between the two parts as long as the term "immediately" or "directly" is not used.

It will be understood that, although the terms "first", "second", etc. can be used herein to describe various elements, these elements are not limited by these terms. These terms are used to distinguish one element from another element. Thus, a first element mentioned below could also be termed as a second element without departing from the technical spirit of the present invention.

Like reference numerals denote like elements throughout the specification.

In the embodiments of the present invention, pixel circuits and touch pixel circuits formed on a substrate of a display panel can be implemented as n-type or p-type MOSFET (metal oxide semiconductor field effect transistor) TFTs (thin-film transistors). A TFT is a three-electrode device with gate, source, and drain. The source is an electrode that provides carriers to the transistor. The carriers in the TFT flow from the source. The drain is an electrode where the carriers leave the TFT. That is, in a MOSFET, carriers flow from the source to the drain. In the case of an n-type TFT (NMOS), the carriers are electrons, and thus the source voltage is lower than the drain voltage so that the electrons flow from the source to the drain. In the n-type TFT, since the electrons flow from the source to the drain, current flows from the drain to the source. In the case of a p-type TFT (PMOS), the carriers are holes, and thus the source voltage is higher than the drain voltage so that the holes flow from the source to the drain. In the p-type TFT, since the holes flow from the source to the drain, current flows from the source to the drain. It should be noted that the source and drain of a MOSFET are not fixed in position. For example, the source and drain of the MOSFET are interchangeable depending on the applied voltage.

In what follows, gate-on voltage is the voltage of a gate signal by which a TFT is turned on, and gate-off voltage is a voltage by which the TFT is turned off. In PMOS, the gate-on voltage is a gate-low voltage VGL, and the gate-off voltage is a gate-high voltage VGH. In NMOS, the gate-on voltage is VGH, and the gate-off voltage is VGL.

Hereinafter, various exemplary embodiments of the present invention will be described in detail with reference to the attached drawings. The terms and names of elements used herein are chosen for ease of description and can be different from the names of parts used in actual products. The exemplary embodiments of the present invention will be described with respect to an organic light-emitting display.

Figure 2:
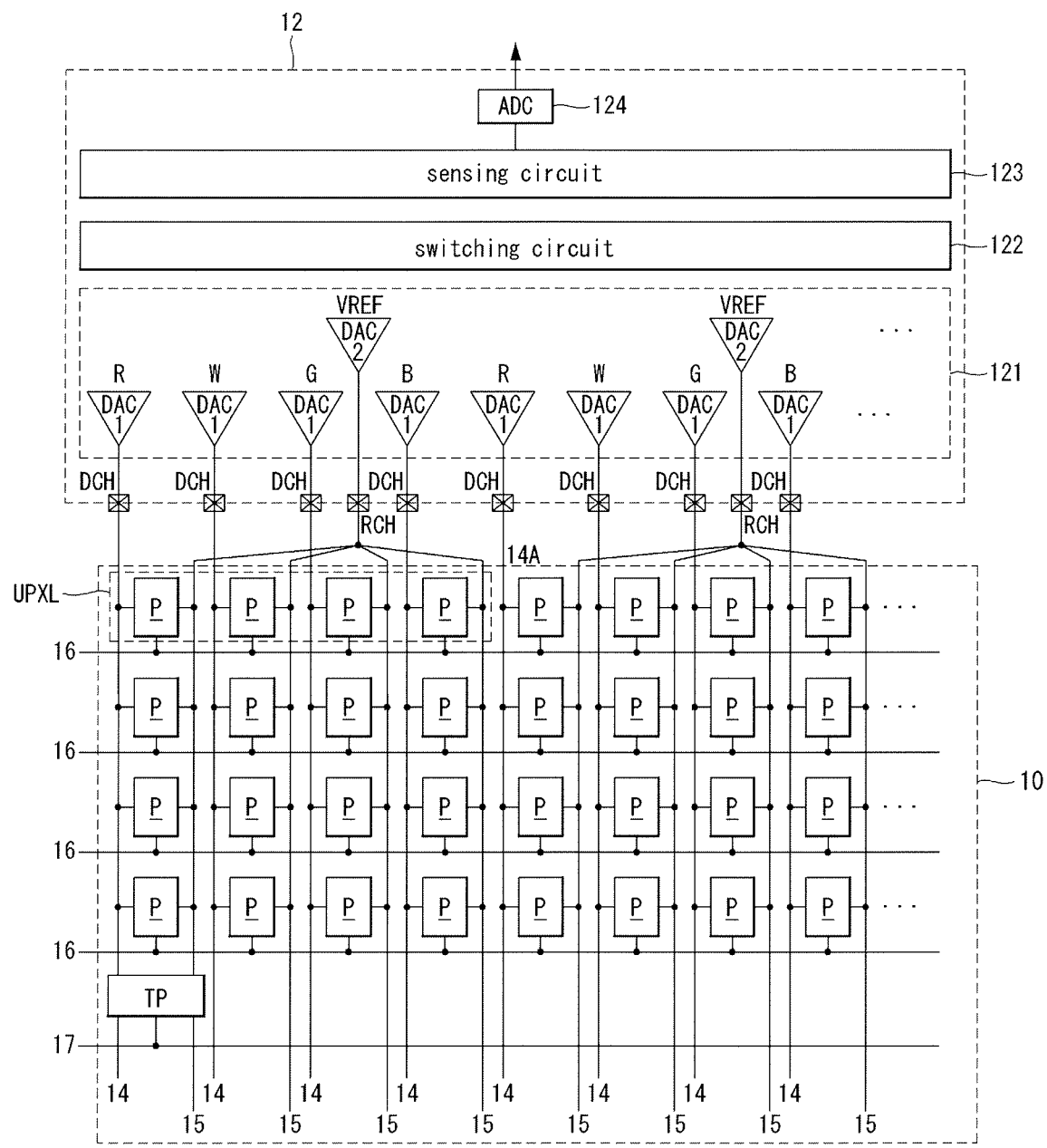
FIG. 2 is a view showing an example of configuration of the pixel array and data drive circuit of FIG. 1.

FIG. 1 is a view showing a touch sensor-integrated display device according to an exemplary embodiment of the present invention. FIG. 2 is a view showing an example of configuration of the pixel array and data drive circuit of FIG. 1. All the components of the touch sensor-integrated display device according to all embodiments of the present invention are operatively coupled and configured.

The touch sensor-integrated display device according to the embodiments of this invention can be implemented as an organic light-emitting display comprising a pixel array for external compensation and a data drive circuit. The touch sensor-integrated display device according to the embodiments of this invention can simplify the overall configuration for touch sensing because it senses touch input using the pixel array for external compensation and the data drive circuit.

Referring to FIGS. 1 and 2, a touch sensor-integrated display device according to an exemplary embodiment of the present invention can comprises a display panel 10, a timing controller 11, a data drive circuit 12, and a gate drive circuit 13.

A plurality of data lines 14 and a plurality of reference lines 15 intersect a plurality of image scan lines 16 on the display panel 10, and pixels P's for external compensation are arranged in a matrix at the intersections to form a pixel array.

Each pixel P can be connected to one of the data lines 14 to which a data voltage is supplied, one of the reference lines 15 to which a reference voltage is applied, and one of the image scan lines 16 to which an image scan signal is supplied. To ensure high aperture ratio, a plurality of pixels P included in a single pixel unit UPXL can share a single reference line 15. The reference line 15 can be used as an external compensation sensing line for sensing the driving characteristics of each pixel P. The pixel unit UPXL can be made up of, but not limited to, four pixels including a red pixel, a green pixel, a blue pixel, and a white pixel. Each pixel P can receive a high-level driving voltage and a low-level driving voltage from a power generator.

The pixel array can be divided into a plurality of touch blocks. Each touch block can have a plurality of pixels P's for displaying an input image and at least one touch pixel TP for sensing touch input. The touch pixel TP can be positioned to correspond to at least one pixel unit UPXL.

The touch pixel TP is connected to a touch sensing line and a touch scan line 17. The touch sensing line can be one of signal lines commonly connected to the pixels P's and the touch pixel TP. The touch sensing line can be at least one of data lines 14 allocated to each touch block or at least one of reference lines 15 allocated to each touch block. If data lines 14 or reference lines 15 in the pixel array are used as the touch sensing lines, this eliminates the need to add touch sensor lines and minimizes additional elements for touch sensing.

The touch scan line 17 is not connected to the pixels P's but can be only connected to the touch pixel TP. A touch scan signal for driving the touch pixel TP is supplied to the touch scan line 17.

The timing controller 11 can switch the driving mode from a non-touch operation mode to a touch operation mode or vice versa, based on whether or not there is a touch input, user's mode selection information, distance information between the display device and the user, etc.

The timing controller 11 generates a data control signal DDC for controlling the operation timing of the data drive circuit 12 and a gate control signal GDC for controlling the operation timing of the gate drive circuit 13, based on timing signals such as a vertical synchronization signal Vsync, a horizontal synchronization signal Hsync, a dot clock signal DCLK, and a data enable signal DE. In the non-touch operation mode, the timing controller 11 can divide one image frame into a first period during which image data DATA is written and a second period during which external compensation sensing is done, and can vary the control signals DDC and GDC for the first and second periods. The timing controller 11 can allocate a third period within the image frame, during which touch sensing is done in the touch operation mode, and can vary the control signals DDC and GDC for the first to third periods.

To provide an external compensation sensing period and/or a touch sensing period, the timing controller 11 can modulate an input frame frequency using the control signals DDC and GDC so that the screen refreshes at a lower frame frequency.

The gate control signal GDC comprises a gate start pulse GSP, a gate shift clock GSC, etc. The gate start pulse GSP is applied to a gate stage for generating a first scan signal and controls the gate stage to generate the first scan signal. The gate shift clock GSC is a clock signal that is commonly input into gate stages and shifts the gate start pulse GSP.

The data control signal DDC comprises a source start pulse SSP, a source sampling clock SSC, and a source output enable signal SOE. The source start pulse SSP controls the timing of the start of data sampling of the data drive circuit 12. The source sampling clock SSC is a clock signal that controls the timing of data sampling based on a rising or falling edge. The source output enable signal SOE controls the output timing of the data drive circuit 12. The data control signal DDC comprises control signals CON for controlling the operation of a sensing circuit 123 included in the data drive circuit 12.

The timing controller 11 can compensate for variations in brightness between pixels caused by variations in driving characteristics by correcting input image data DATA based on a driving characteristic sensing value obtained from an external compensation sensing operation. The timing controller 11 can compare a touch sensing value obtained from a touch sensing operation with a predetermined reference value and obtain the coordinates of the touch input position.

The timing controller 11 sends input image data DATA for image display to the data drive circuit 12.

The data drive circuit 12 is driven in accordance with the data control signal DDC, and can comprise a data voltage generation circuit 121, a switching circuit 122, a sensing circuit 123, and an analog-to-digital converter (hereinafter, ADC) 124.

The data voltage generation circuit 121 comprises a plurality of first digital-to-analog converters (hereinafter, DAC1) connected to the data lines 14 and a plurality of second digital-to-analog converters (hereinafter, DAC2) connected to the reference lines 15.

The DACs DAC1 are connected to the data lines 14 through data channel terminals DCH. In the non-touch operation mode, the DACs DAC1 can convert input image data DATA into a data voltage for image display and supply it to the data lines 14. In the non-touch operation mode, the DACs DAC1 can generate a data voltage for external compensation and supply it to the data lines 14. Meanwhile, if the data lines 14 are used as the touch sensing lines, the DACs DAC1 can generate a data voltage for touch operation and supply it to the data lines 14 in the touch operation mode. The data voltage for touch operation can be applied to the touch pixel TP in each touch block to charge it, in synchronization with a touch scan signal.

The DACs DAC2 are connected to the reference lines 15 through reference channel terminals RCH. In the non-touch operation mode, the DACs DAC2 can generate a preset reference voltage VREF and supply it to the reference lines 15. Meanwhile, if the reference lines 15 are used as the touch sensing lines, the DACs DAC2 can generate a reference voltage for touch operation and supply it to the reference lines 15 in the touch operation mode. The reference voltage for touch operation can be applied to the touch pixel TP in each touch block to charge it, in synchronization with a touch scan signal.

The sensing circuit 123 comprises a plurality of touch sensing units and a plurality of pixel sensing units. The pixel sensing units sense a pixel current representing the driving characteristics of each pixel P through the reference lines 15. The touch sensing units can sense an electrical charge discharged from the touch pixel in each touch block through the touch sensing lines. If the data lines 14 are used as the touch sensing lines, the touch sensing units and the pixel sensing units can be designed to work independently. On the other hand, if the reference lines 15 are used as the touch sensing lines, the touch sensing units and the pixel sensing units can be designed to work in an integrated manner.

The switching circuit 122 can selectively connect the data liens 14 to the data voltage generation circuit 121 and the sensing circuit 123. Also, the switching circuit 122 can selectively connect the reference lines 15 to the data voltage generation circuit 121 and the sensing circuit 123. To this end, the switching circuit 122 can comprise a plurality of data switches and a plurality of reference switches.

The ADC 124 converts analog sensing results outputted from the sensing circuit 123 to digital sensing values and supplies them to the timing controller 11. The ADC 124 converts a first analog sensing result obtained from an external compensation sensing operation to a driving characteristic sensing value and converts a second analog sensing result obtained from a touch sensing operation to a touch sensing value.

The gate drive circuit 13 can generate an image display scan signal suitable for image data write operation based on the gate control signal GDC and supply it to the image scan lines 16. The gate drive circuit 13 can generate an external compensation scan signal suitable for external compensation sensing operation based on the gate control signal GDC and supply it to the image scan lines 16. The gate drive circuit 13 can generate a touch scan signal suitable for touch sensing operation based on the gate control signal GDC and supply it to the touch scan lines 17. The gate drive circuit 13 can be embedded in a non-display area of the display panel 10.

Figure 3:
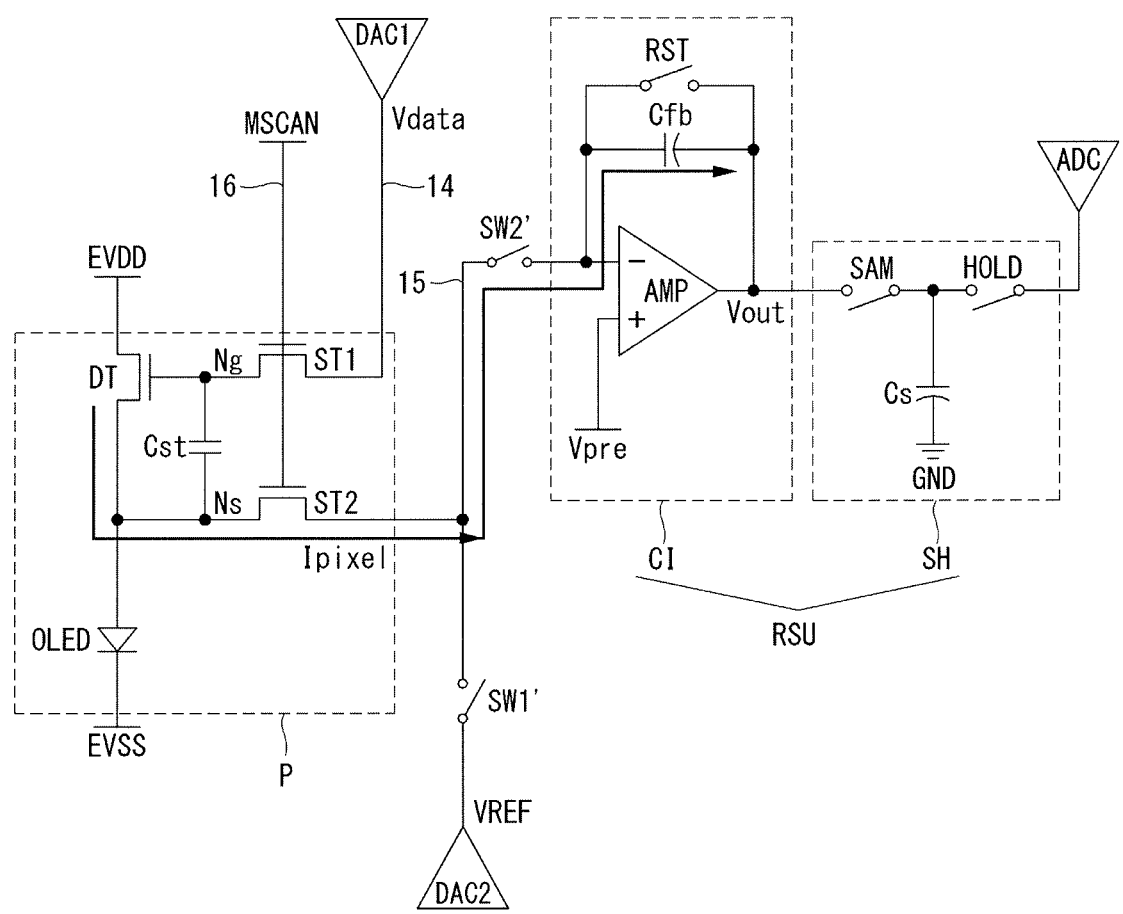
FIG. 3 is a view showing an example of configuration of a pixel and a pixel sensing unit connected to it according to the present invention.
Figure 4:
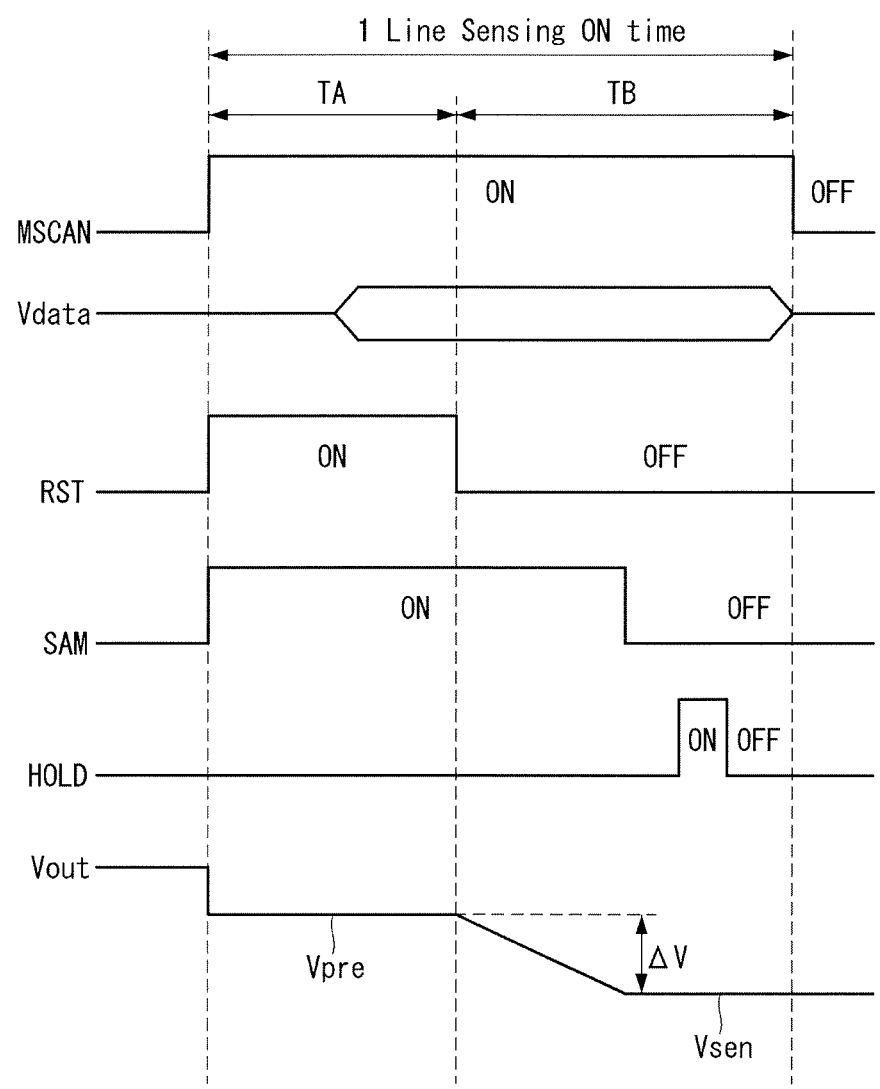
FIG. 4 is a view showing a pixel driving characteristic sensing operation of the pixel sensing unit of FIG. 3.

An Example of Implementation of Pixel for External Compensation and Pixel Sensing Unit FIG. 3 is a view showing an example of configuration of a pixel and a pixel sensing unit connected to it according to an example of the present invention. FIG. 4 is a view showing a pixel driving characteristic sensing operation of the pixel sensing unit of FIG. 3.

Referring to FIG. 3, a pixel P for external compensation according to the present invention can comprise, but not limited to, an OLED (organic light emitting diode), a driving TFT DT, a storage capacitor Cst, a first switching TFT ST1, and a second switching TFT ST2. The TFTs (thin film transistors) can be implemented as P-type or N-type, or a hybrid of the two. Alternatively, semiconductor layers of the TFTs can comprise amorphous silicon, polysilicon, or oxide.

The driving TFT DT is a driving element that generates a pixel current Ipixel in accordance with a gate-source voltage Vgs. The pixel current Ipixel reflects the driving characteristics of the driving TFT DT, for example, the threshold voltage and mobility of the driving TFT DT. The pixel current Ipixel can vary with the driving characteristics of the driving TFT DT.

When the source potential of the driving TFT DT is higher than the operating point voltage of the OLED, the pixel current Ipixel is applied to the OLED and causes the OLED to emit light. When the source potential of the driving TFT DT is lower than the operating point voltage of the OLED, the pixel current Ipixel is applied not to the OLED but to the pixel sensing unit RSU. The driving TFT DT comprises a gate electrode connected to a first node Ng, a drain electrode connected to an input terminal of the high-level driving voltage EVDD, and a source electrode connected to a second node Ns.

The storage capacitor Cst is connected between the first node Ng and the second node Ns. The storage capacitor Cst holds the gate-source voltage Vg of the driving TFT DT for a given period of time.

The first switching TFT ST1 switches an electrical connection between the data line 14 and the first node Ng in accordance with an external compensation scan signal MSCAN. The first switching TFT ST1 comprises a gate electrode connected to the image scan line 16, a drain electrode connected to the data line 14, and a source electrode connected to the first node Ng.

The second switching TFT ST2 switches an electrical connection between the second node Ns and the reference line 15 in accordance with the external compensation scan signal MSCAN. The second switching TFT ST2 comprises a gate electrode connected to the image scan line 16, a drain electrode connected to the reference line 15, and a source electrode connected to the second node Ns.

Referring to FIG. 3, the pixel sensing unit RSU of this invention can be implemented as current sensing type, but is not limited to it and can be implemented as voltage sensing type. In FIG. 3, SW1' and SW2' denote respectively first and second reference switches included in the switching circuit 122 of FIG. 2.

The current sensing-type pixel sensing unit RSU shown in FIG. 3 can directly sense a pixel current Ipixel delivered through the reference line 15, and can comprise a current integrator CI and a sample & hold circuit SH.

The current integrator CI produces an analog sensing result Vout by performing an integration of an electric current fed through the reference line 15. The current integrator CI comprises an amp AMP comprising an inverting input terminal (−) that receives a pixel current Ipixel from the reference line 15, a non-inverting input terminal (+) that receives a reset voltage Vpre, and an output terminal, an integrating capacitor Cfb connected between the inverting input terminal (−) and output terminal of the amp AMP, and a reset switch RST connected to both ends of the integrating capacitor Cfb. The current integrator CI is connected to the ADC through the sample & hold circuit SH. The sample & hold circuit SH can comprise a sampling switch SAM for sampling the analog sensing result Vout outputted from the amp AMP and storing it in a sampling capacitor Cs, and a holding switch HOLD for sending the driving characteristic sensing value Vsen stored in the sampling capacitor Cs to the ADC.

FIG. 4 illustrates the waveforms of a sensing operation for each pixel P, during 1 line sensing ON time which is defined as the pulse on time of an external compensation scan signal MSCAN. Referring to FIG. 4, an external compensation sensing operation can comprise a reset period TA and a sensing period TB. In the external compensation sensing operation, the first reference switch SW1' stays turned off, and the second reference switch SW2' stays turned on.

In the reset period TA, the reset switch RST is turned on, and the amp AMP operates as a unit gain buffer with a gain of 1. In the reset period TA, the input terminals (+,−) and output terminal of the amp AMP and the reference line 15 are all reset to the reference voltage Vpre.

During the reset period TA, the second switching TFT ST2 is turned on, and the second node Ns is reset to the reset voltage Vpre. During the reset period TA, the first switching TFT ST1 is turned on, and a data voltage Vdata for external compensation is applied to the first node Ng through the data line 14. Accordingly, a pixel current Ipixel equivalent to the potential difference {(Vdata−S)−Vpre} between the first node Ng and the second node Ns flows through the driving TFT DT. However, since the amp AMP continues to operate as the unit gain buffer during the reset period TA, the potential Vout of the output terminal is maintained at the reference voltage Vpre.

In the sensing period TB, when the first and second switching TFTs ST1 and ST2 stay turned on, the reset switch RST is turned off, and the sampling switch SAM is turned on, and the amp AMP operates as a current integrator and performs an integration of the pixel current Ipixel flowing through the driving TFT DT. In the sensing period TB, due to the pixel current Ipx flowing into the inverting input terminal (−) of the amp AMP, the potential difference between both ends of the integrating capacitor Cfb increases as the sensing time passes, i.e., the amount of accumulated current increases. However, due to the characteristics of the amp AMP, the inverting input terminal (−) and the non-inverting input terminal (+) are shorted through a virtual ground, leaving a potential difference of zero between them. Thus, the potential at the inverting input terminal (−) is maintained at the reset voltage Vpre during the sensing period TB, regardless of an increase in the potential difference across the integrating capacitor Cfb. Instead, the potential at the output terminal of the amp AMP decreases in response to the potential difference between both ends of the integrating capacitor Cfb. Based on this principle, in the sensing period TB, the pixel current Ipixel fed through the reference line 15 is accumulated and produced as an analog sensing result Vout through the integrating capacitor Cfb. As more pixel current Ipixel is fed through the reference line 15, the slope of the analog sensing result Vout falls more rapidly. Thus, the larger the amount of pixel current Ipixel, the smaller the value of the analog sensing result Vout. In other words, the voltage difference ΔV between the reset voltage Vpre and the sensing result Vout increases in proportion to the pixel current Ipixel. In the sensing period TB, the analog sensing result Vout is stored in the sampling capacitor Cs while the sampling switch SAM stays turned on, and is then fed to the ADC when the holding switch HOLD is turned on. The ADC converts the analog sensing result Vout to a driving characteristic sensing value and outputs it to the timing controller 11.

The capacitance of the integrating capacitor Cfb included in the current integrator CI is only one-several hundredths of the capacitance of a line capacitor (parasitic capacitor) existing across the reference line 15. Thus, the current sensing method of this invention can drastically reduce the time taken to reach an analog sensing result Vout. In the current sensing method of this invention, it takes much less time to sense threshold voltage and mobility because the pixel current Ipixel of the driving TFT DT can be integrated and sampled within a short time through current sensing.

An Example of Implementation Using Data Lines as Touch Sensing Lines

Figure 5:
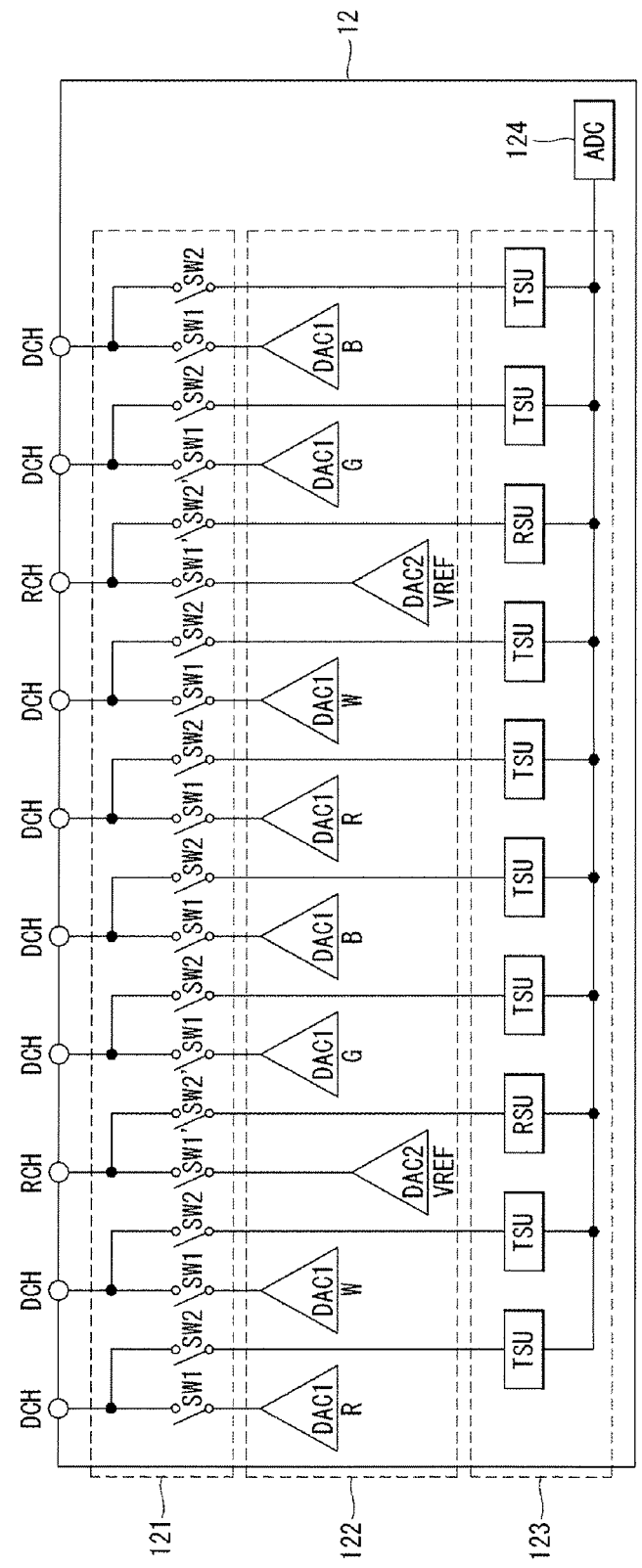
FIG. 5 is a view showing an example of configuration of a data drive circuit when data lines are used as touch sensing lines according to a first exemplary embodiment of the present invention.
Figure 6:
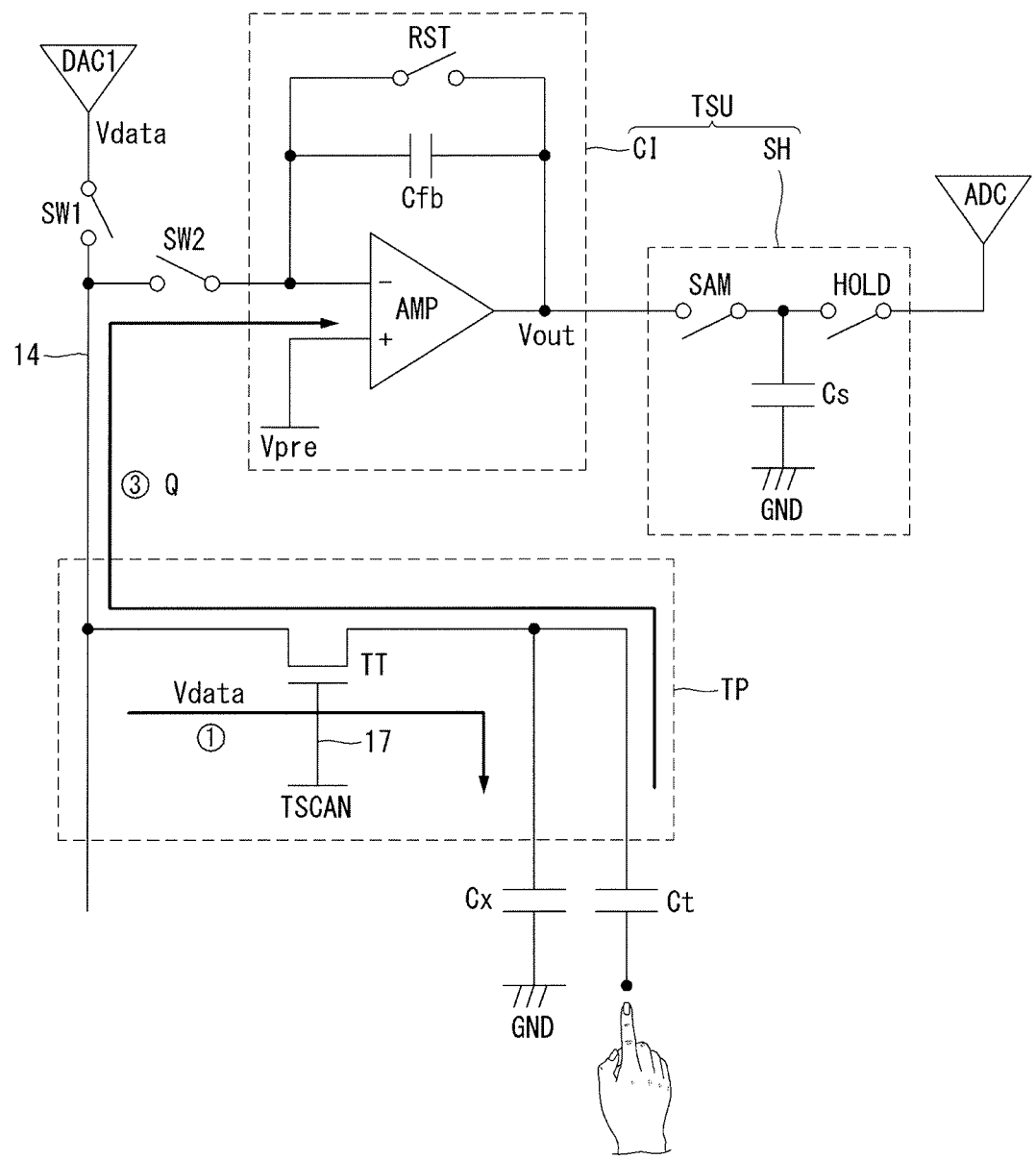
FIG. 6 is a view showing an example of configuration of a touch pixel and a touch sensing unit connected to it according to the first exemplary embodiment of the present invention.
Figure 7:
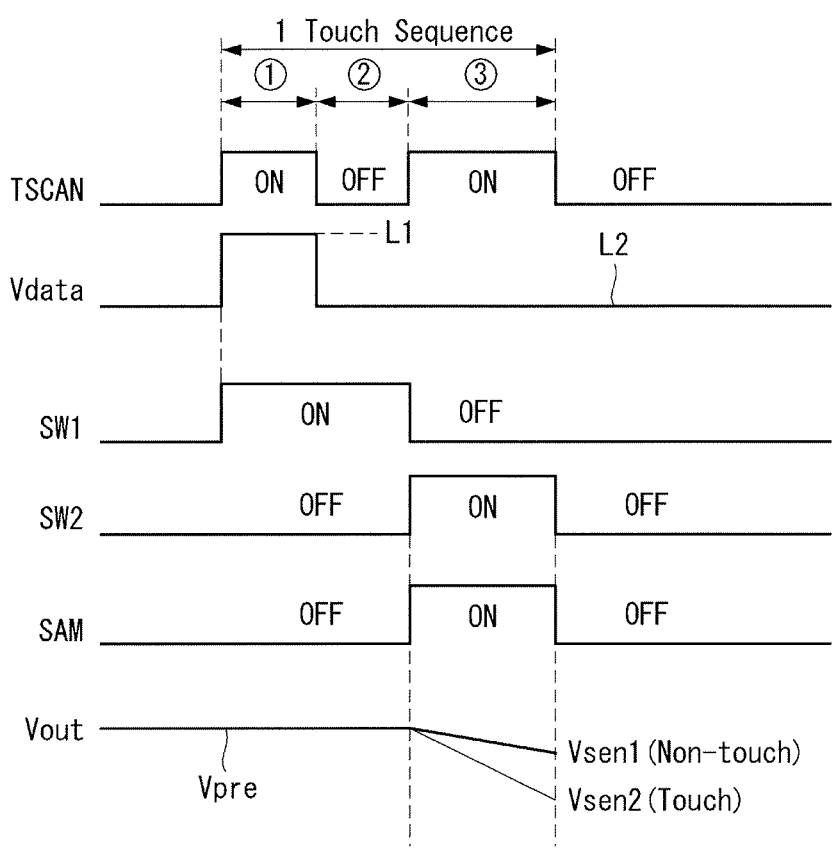
FIG. 7 is a view showing 1 touch sequence based on FIG. 6.

FIG. 5 is a view showing an example of configuration of a data drive circuit when data lines are used as touch sensing lines according to a first exemplary embodiment of the present invention. FIG. 6 is a view showing an example of configuration of a touch pixel and a touch sensing unit connected to it according to the first exemplary embodiment of the present invention. FIG. 7 is a view showing 1 touch sequence based on FIG. 6.

Referring to FIG. 5, a data drive circuit 12 according to an exemplary embodiment of the present invention can comprise first components for touch sensing operation, second components for external compensation sensing operation, and third components for image display operation.

The first components can comprise a plurality of data channel terminals DCH connected to the data lines 14, a plurality of DACs DAC1 generating a data voltage (charging voltage) for touch operation to be supplied to the data channel terminals DCH, a plurality of touch sensing units TSU receiving an electrical charge discharged from the touch pixels TP through the data channel terminals DCH and outputting a touch sensing value, first data switches SW1 connected between the data channel terminals DCH and the DACs DAC1, and second data switches SW2 connected between the data channel terminals DCH and the touch sensing units TSU.

The second components can comprise a plurality of reference channel terminals RCH connected to the pixels P's through a plurality of reference lines 15, a plurality of pixel sensing units RSU sensing a pixel current Ipixel fed through the reference lines 15 and the reference channel terminals RCH, in accordance with the driving characteristics of the pixels P's, first reference switches SW1' connected between the reference channel terminals RCH and DACs DAC2, and second reference switches SW2' connected between the reference channel terminals RCH and the pixel sensing units RSU.

The third components can comprise a plurality of data channel terminals DCH connected to the data lines 14, a plurality of DACs DAC1 generating a data voltage for image display to be supplied to the data channel terminals DCH, a plurality of reference channel terminals RCH connected to the pixels P's through the plurality of reference lines 15, and a plurality of DACs DAC2 generating a reference voltage to be supplied to the reference channel terminals RCH.

Referring to FIG. 6, a touch pixel TP according to the first exemplary embodiment of the present invention can comprise a touch TFT TT having a first electrode (either a source or drain electrode) connected to one of the data lines 14, a gate electrode connected to one of the touch scan lines 17, and a second electrode (the other one of the source and drain electrodes) which is floating.

When there is a touch input, a touch capacitor Ct can be formed between the second electrode of the touch TFT TT and a touch input element, with a substrate (dielectric material) in between. Here, the touch input element can be a conductive touch input tool, for example, a finger or a stylus pen. A parasitic capacitor Cx can be formed between the second electrode of the touch TFT TT and a ground terminal GND.

A data voltage (charging voltage) Vdata for touch operation can be stored in the touch capacitor Ct and parasitic capacitor Cx of the touch pixel TP in the first touch block to which the touch input is applied, and can be stored in the parasitic capacitor Cx of the touch pixel TP in the second touch block to which no touch input is applied. The total capacitance Ct+Cx of the first touch block is greater than the total capacitance Cx of the second touch block. In the present invention, since the quantity Q of electric charge discharged from the touch pixel TP in the first touch block is greater than the quantity Q of electric charge discharged from the touch pixel TP in the second touch block, the presence or absence of a touch input can be determined based on these quantities Q of electric charge.

Referring to FIG. 6, a touch sensing unit TSU according to the first exemplary embodiment of the present invention is for directly sensing an electrical charge discharged from a touch pixel TP through a data line 14, and can comprise a current integrator CI and a sample & hold circuit SH.

The configurations of the current integrator CI and sample & hold circuit SH are substantially the same as those explained in FIG. 3. In FIG. 6, SW1 and SW2 denote respectively first and second data switches included in the switching circuit 122 of FIG. 5.

FIG. 7 illustrates the waveforms of a sensing operation for one touch pixel TP, during 1 touch sequence which is defined in accordance with a touch scan signal TSCAN. Referring to FIG. 7, a touch sensing operation can comprise a charging period $\hat{1}$ for applying a charging voltage to the touch pixel TP in each touch block, a reset period $\hat{2}$ for resetting the data line 14, and a sensing period $\hat{3}$ for sensing an electrical charge discharged from the touch pixel TP in each touch block.

In the charging period $\hat{1}$, the first data switch SW1 is turned on to supply the data line 14 with a data voltage Vdata for touch operation of a charging level L1 generated by the DAC DAC1. In the charging period $\hat{1}$, the data voltage Vdata for touch operation is applied to the touch pixel TP through the touch TFT TT which is turned on in response to the touch scan signal TSCAN. The data voltage Vdata for touch operation of the charging level L1 can be stored in the touch capacitor Ct and parasitic capacitor Cx of the touch pixel TP in the first touch block to which a touch input is applied, and can be stored in the parasitic capacitor Cx of the touch pixel TP in the second touch block to which no touch input is applied.

In the reset period $\hat{2}$, the first data switch SW1 stays turned on and supplies the data line 14 with a data voltage Vdata for touch operation of a reset level L2 (L2<L1) generated by the DAC DAC1. The potential of the data line 14 is reset to the reset level L2 by the data voltage Vdata for touch operation of the reset level L2 (L2<L1). In the reset period $\hat{2}$, the touch TFT TT is turned off in response to the touch scan signal TSCAN, and holds the voltage stored during the charging period $\hat{1}$.

In the sensing period $\hat{3}$, the first data switch SW1 is turned off to cut off the electrical connection between the data line 14 and the DAC DAC1, and the second data switch SW2 is turned on to connect the data line 14 and the touch sensing unit TSU. In the sensing period $\hat{3}$, the touch TFT TT is turned on in response to the touch scan signal TSCAN to connect the touch pixel TP and the data line 14. Also, the sampling switch SAM of the touch sensing unit TSU is turned on. As a result, the charging voltage for the touch pixel TP is applied to the touch sensing unit TSU through the data line 14 and accumulated in the integrating capacitor Cfb of the touch sensing unit TSU and then sampled by the sampling capacitor Cs. In this instance, the reset switch RST stays turned off.

Analog touch sensing values Vsen1 and Vsen2 (Vsen1>Vsen2) outputted from the touch sensing unit TSU to the ADC are smaller in the first touch block, to which a touch input is applied, than in the second touch block, to which no touch input is applied. This is because the quantity Q of electric charge discharged from the touch pixel TP in the first touch block having a relatively higher total capacitance Ct+Cx is greater than the quantity Q of electric charge discharged from the touch pixel TP in the second touch block having a relatively smaller total capacitance Cx. In other words, the amount of electrical current discharged from the touch pixel TP in the first touch block is greater than the amount of electrical current discharged from the touch pixel TP in the second touch block.

Figure 8:
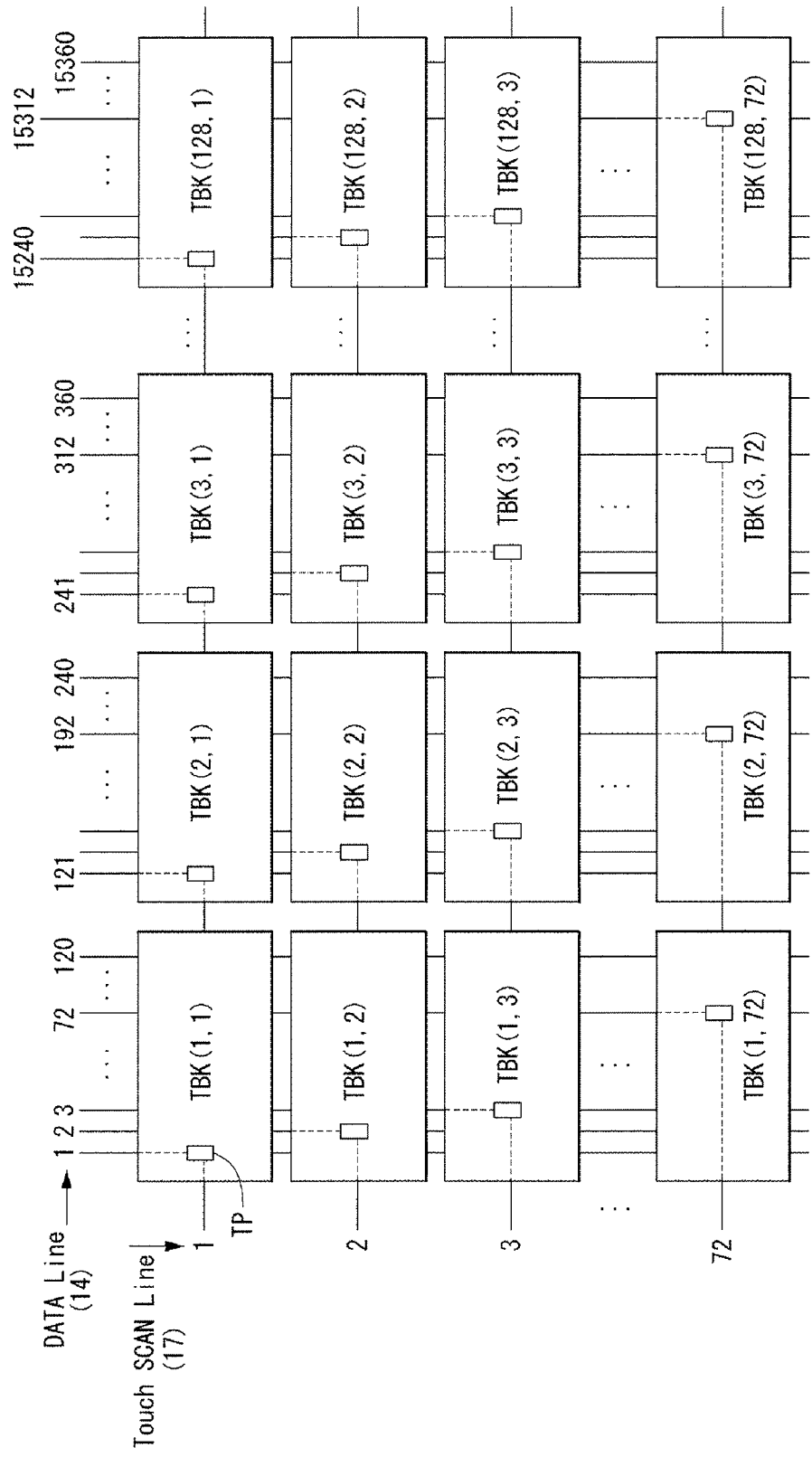
FIG. 8 is a view showing touch blocks and data lines connected to them according to the first exemplary embodiment of the present invention.
Figure 9:
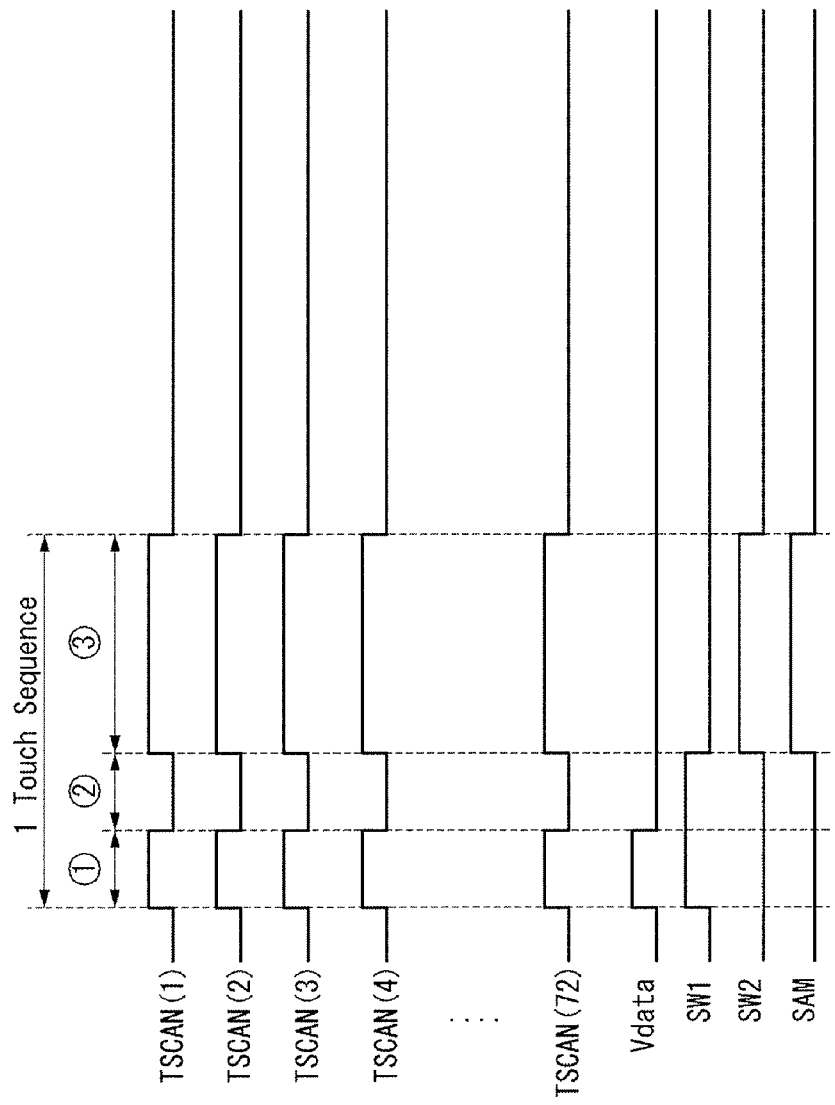
FIG. 9 is a view showing how the touch blocks of FIG. 8 are simultaneously sensed in 1 touch sequence.

FIG. 8 is a view showing touch blocks and data lines connected to them according to the first exemplary embodiment of the present invention. FIG. 9 is a view showing how the touch blocks of FIG. 8 are simultaneously sensed in 1 touch sequence.

Referring to FIG. 8, for a UHD (ultra-high definition) resolution, the number of data lines 14 is 15,360 (3840×4 (RWGB)) which is the horizontal resolution, and the number of image scan lines is 2,160 which is the vertical resolution. In this case, if the size of 1 touch block BLK is set to 120(horizontal resolution)×30(vertical resolution) in consideration of the touch surface area of the touch input element, the number of touch blocks BLK that can be simultaneously sensed is 128×72. In this case, the touch blocks BLK can be individually connected to the touch sensing units TSU through different data lines 14. Thus, as shown in FIG. 9, touch inputs on all the touch blocks BLK(1,1) to BLK(128, 72) can be simultaneously sensed in one touch sequence within 1 touch frame.

In FIG. 8, each touch block BLK can have one touch pixel TP, and the number of touch sensing units TSU can be 9,216 (72×128). The touch pixel TP in a touch block BLK(1,1) can be connected to a first touch sensing unit TSU through a first data line 1, the touch pixel TP in a touch block BLK(2,2) can be connected to a 122nd touch sensing unit TSU through a 122nd data line 122, the touch pixel TP in a touch block BLK(3,3) can be connected to a 243rd touch sensing unit TSU through a 243rd data line 243, and the touch pixel TP in a touch block BLK(128,72) can be connected to a 15312nd touch sensing unit TSU through a 15312nd data line 15312. In this instance, the touch pixel TP in the touch block BLK(1,1) can be connected to a first touch scan line 1, the touch pixel TP in the touch block BLK(2,2) can be connected to a second touch scan line 2, the touch pixel TP in the touch block BLK(3,3) can be connected to a third touch scan line 3, and the touch pixel TP in the touch block BLK(128,72) can be connected to a 72th touch scan line 72.

By using the data lines as the touch sensing lines, there is no need to add sensor lines for touch sensing, the number of touch blocks that can be simultaneously sensed can be increased, and touch frames refresh at faster refresh rate. Increasing the touch frame refresh rate increases the touch report rate, thereby improving touch sensitivity. This is because a host system updates the coordinates of a touch input at the frequency of the touch report rate. Thus, the host system's response rate to touch input is proportional to the touch report rate. Touch report rate is the frequency at which coordinate data obtained from all touch sensors within a touchscreen is sent to an external host system. The higher the touch report rate, the faster the rate at which the coordinates of touch input is updated. Thus, the user's touch sensitivity can be improved, and touch input trajectories can be rendered precisely.

An Example of Implementation Using Reference Lines as Touch Sensing Lines

Figure 10:
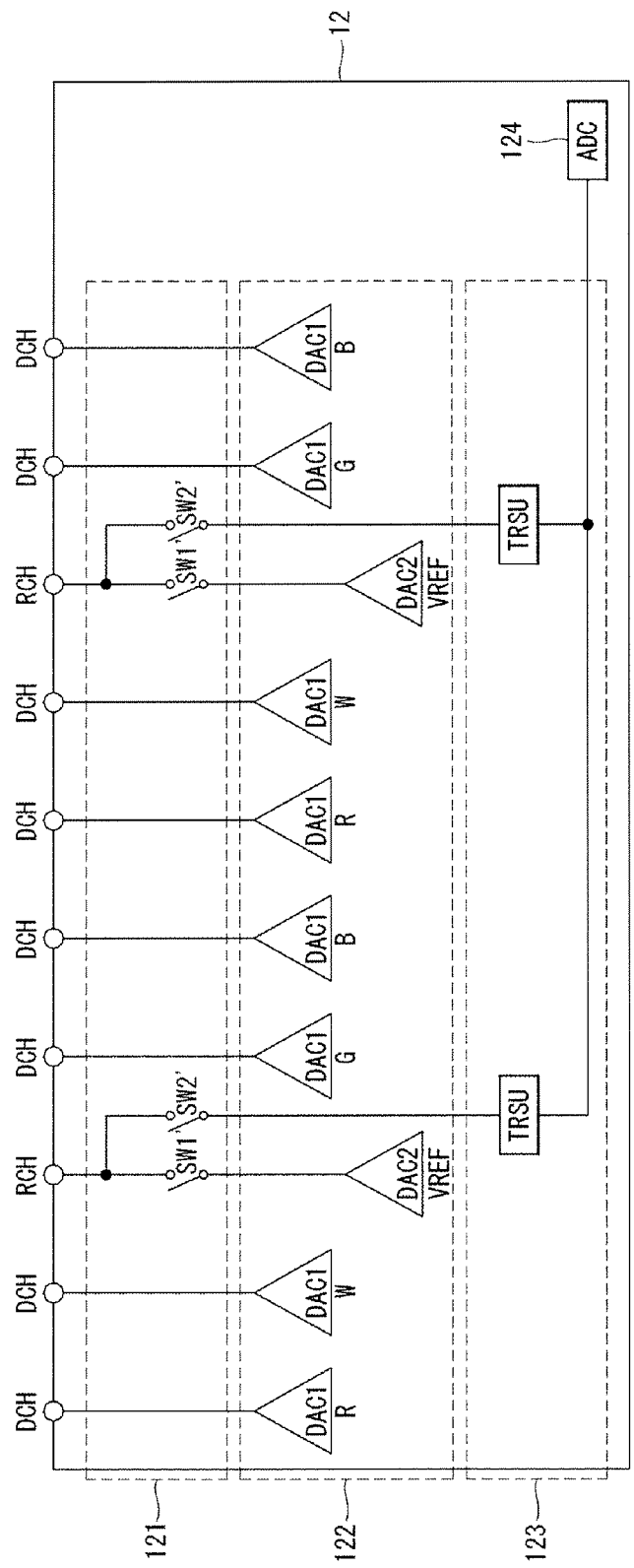
FIG. 10 is a view showing an example of configuration of a data drive circuit when reference lines are used as touch sensing lines according to a second exemplary embodiment of the present invention.
Figure 11:
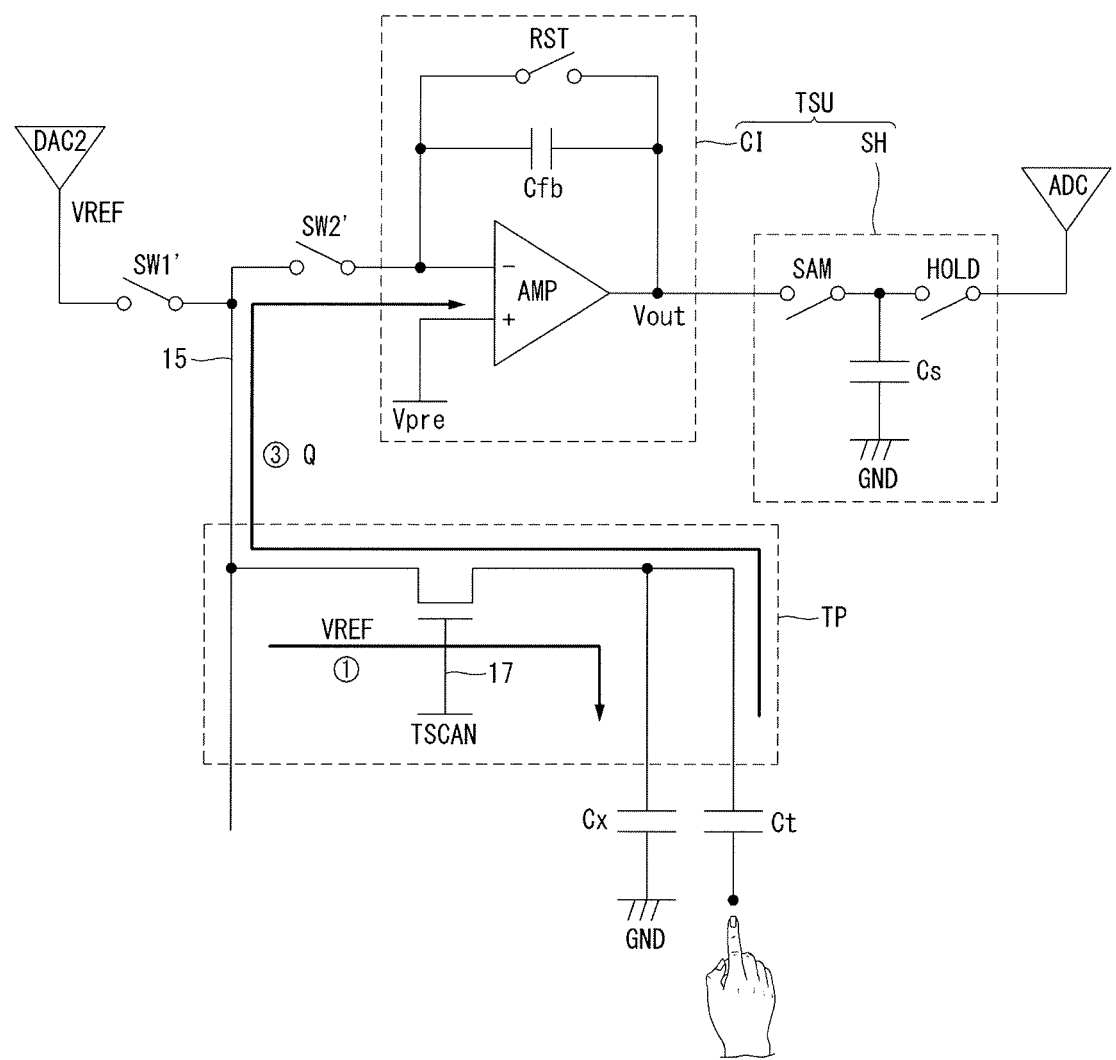
FIG. 11 is a view showing an example of configuration of a touch pixel and a touch sensing unit connected to it according to the second exemplary embodiment of the present invention.
Figure 12:
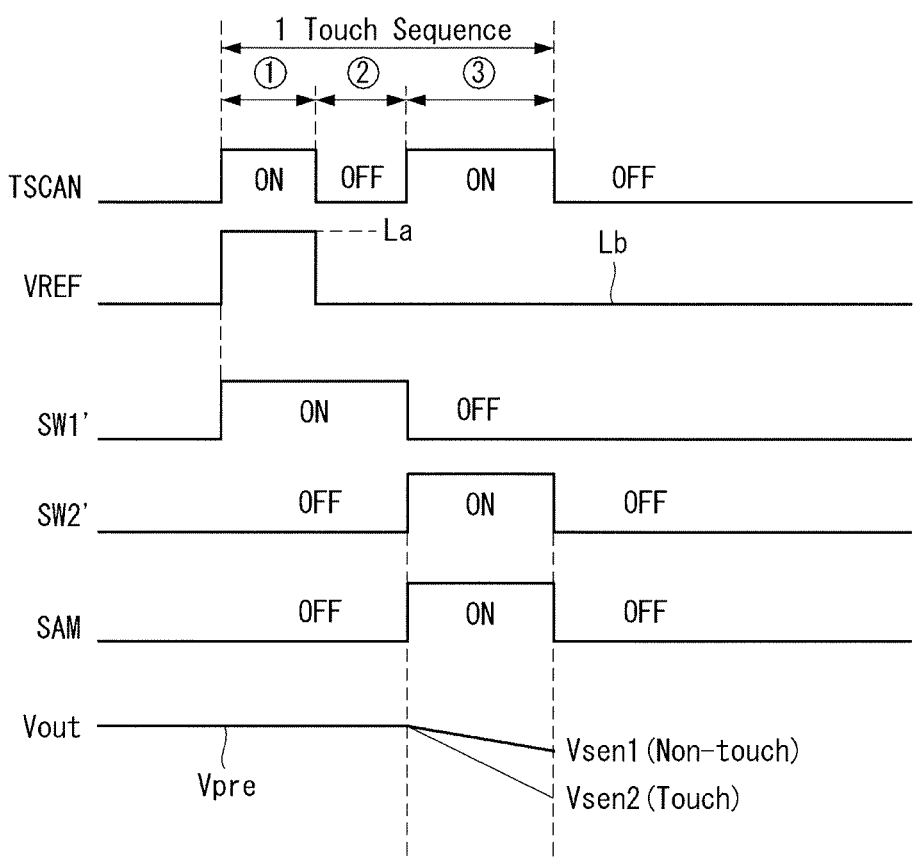
FIG. 12 is a view showing 1 touch sequence based on FIG. 11.

FIG. 10 is a view showing an example of configuration of a data drive circuit when reference lines are used as touch sensing lines according to a second exemplary embodiment of the present invention. FIG. 11 is a view showing an example of configuration of a touch pixel and a touch sensing unit connected to it according to the second exemplary embodiment of the present invention. FIG. 12 is a view showing 1 touch sequence based on FIG. 11.

Referring to FIG. 10, a data drive circuit 12 according to an exemplary embodiment of the present invention can comprise first components for touch sensing operation and external compensation sensing operation and second components for image display operation.

The first components can comprise a plurality of reference channel terminals RCH connected to the pixels P's and the touch pixels TP through a plurality of reference lines 15, a plurality of DACs DAC2 generating a reference voltage (charging voltage) for touch operation to be supplied to the reference channel terminals RCH, a plurality of touch/pixel sensing units TRSU receiving an electrical charge discharged from the touch pixels TP through the reference channel terminals RCH and outputting a touch sensing value, first reference switches SW1' connected between the reference channel terminals RCH and the DACs DAC2, and second reference switches SW2' connected between the reference channel terminals RCH and the touch/pixel sensing units TRSU.

The second components can comprise a plurality of data channel terminals DCH connected to the data lines 14, a plurality of DACs DAC1 generating a data voltage for image display to be supplied to the data channel terminals DCH, a plurality of reference channel terminals RCH connected to the pixels P's through the plurality of reference lines 15, and a plurality of DACs DAC2 generating a reference voltage to be supplied to the reference channel terminals RCH.

Referring to FIG. 11, a touch pixel TP according to the second exemplary embodiment of the present invention can comprise a touch TFT TT having a first electrode (either a source or drain electrode) connected to one of the data lines 14, a gate electrode connected to one of the touch scan lines 17, and a second electrode (the other one of the source and drain electrodes) which is floating.

When there is a touch input, a touch capacitor Ct can be formed between the second electrode of the touch TFT TT and a touch input element, with a substrate (dielectric material) in between. Here, the touch input element can be a conductive touch input tool, for example, a finger or a stylus pen. A parasitic capacitor Cx can be formed between the second electrode of the touch TFT TT and a ground terminal GND.

A reference voltage (charging voltage) VREF for touch operation can be stored in the touch capacitor Ct and parasitic capacitor Cx of the touch pixel TP in the first touch block to which the touch input is applied, and can be stored in the parasitic capacitor Cx of the touch pixel TP in the second touch block to which no touch input is applied. The total capacitance Ct+Cx of the first touch block is greater than the total capacitance Cx of the second touch block. In the present invention, since the quantity Q of electric charge discharged from the touch pixel TP in the first touch block is greater than the quantity Q of electric charge discharged from the touch pixel TP in the second touch block, the presence or absence of a touch input can be determined based on these quantities Q of electric charge.

Referring to FIG. 11, a touch sensing unit TSU according to the second exemplary embodiment of the present invention is for directly sensing an electrical charge discharged from a touch pixel TP through a reference line 15, and can comprise a current integrator CI and a sample & hold circuit SH.

The configurations of the current integrator CI and sample & hold circuit SH are substantially the same as those explained in FIG. 3. In FIG. 11, SW1' and SW2' denote first and second reference switches included in the switching circuit 122 of FIG. 10.

FIG. 12 illustrates the waveforms of a sensing operation for one touch pixel TP, during 1 touch sequence which is defined in accordance with a touch scan signal TSCAN. Referring to FIG. 12, a touch sensing operation can comprise a charging period $\hat{1}$ for applying a charging voltage to the touch pixel TP in each touch block, a reset period $\hat{2}$ for resetting the reference line 15, and a sensing period $\hat{3}$ for sensing an electrical charge discharged from the touch pixel TP in each touch block.

In the charging period $\hat{1}$, the first reference switch SW1' is turned on to supply the reference line 15 with a reference voltage VREF for touch operation of a charging level La generated by the DAC DAC2. In the charging period $\hat{1}$, the reference voltage VREF for touch operation is applied to the touch pixel TP through the touch TFT TT which is turned on in response to the touch scan signal TSCAN. The reference voltage VREF for touch operation of the charging level La can be stored in the touch capacitor Ct and parasitic capacitor Cx of the touch pixel TP in the first touch block to which a touch input is applied, and can be stored in the parasitic capacitor Cx of the touch pixel TP in the second touch block to which no touch input is applied.

In the reset period $\hat{2}$, the first reference switch SW1' stays turned on and supplies the reference line 15 with a reference voltage VREF for touch operation of a reset level Lb (Lb<La) generated by the DAC DAC2. The potential of the reference line 15 is reset to the reset level Lb by the reference voltage VREF for touch operation of the reset level Lb (Lb<La). In the reset period $\hat{2}$, the touch TFT TT is turned off in response to the touch scan signal TSCAN, and holds the voltage stored during the charging period $\hat{1}$.

In the sensing period $\hat{3}$, the first reference switch SW1' is turned off to cut off the electrical connection between the reference line 15 and the DAC DAC2, and the second reference switch SW2' is turned on to connect the reference line 15 and the touch/pixel sensing unit TRSU. In the sensing period $\hat{3}$, the touch TFT TT is turned on in response to the touch scan signal TSCAN to connect the touch pixel TP and the reference line 15. Also, the sampling switch SAM of the touch/pixel sensing unit TRSU is turned on. As a result, the charging voltage for the touch pixel TP is applied to the touch/pixel sensing unit TRSU through the reference line 15 and accumulated in the integrating capacitor Cfb of the touch/pixel sensing unit TRSU and then sampled by the sampling capacitor Cs. In this instance, the reset switch RST stays turned off. Analog touch sensing values Vsen1 and Vsen2 (Vsen1>Vsen2) outputted from the touch/pixel sensing unit TRSU to the ADC are smaller in the first touch block, to which a touch input is applied, than in the second touch block, to which no touch input is applied. This is because the quantity Q of electric charge discharged from the touch pixel TP in the first touch block having a relatively higher total capacitance Ct+Cx is greater than the quantity Q of electric charge discharged from the touch pixel TP in the second touch block having a relatively smaller total capacitance Cx. In other words, the amount of electrical current discharged from the touch pixel TP in the first touch block is greater than the amount of electrical current discharged from the touch pixel TP in the second touch block.

Figure 13:
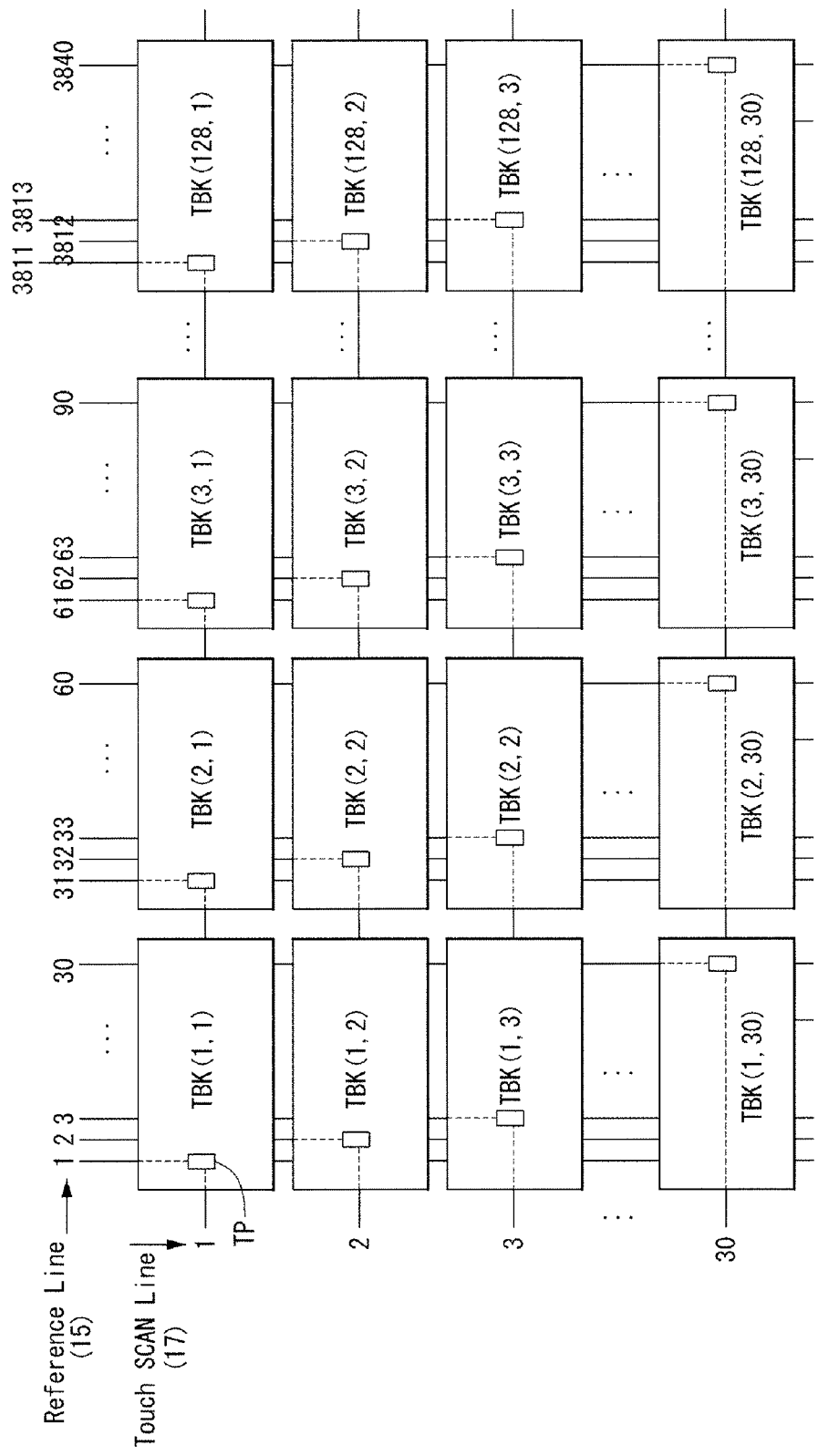
FIG. 13 is a view showing touch blocks and reference lines connected to them according to the second exemplary embodiment of the present invention.
Figure 14:
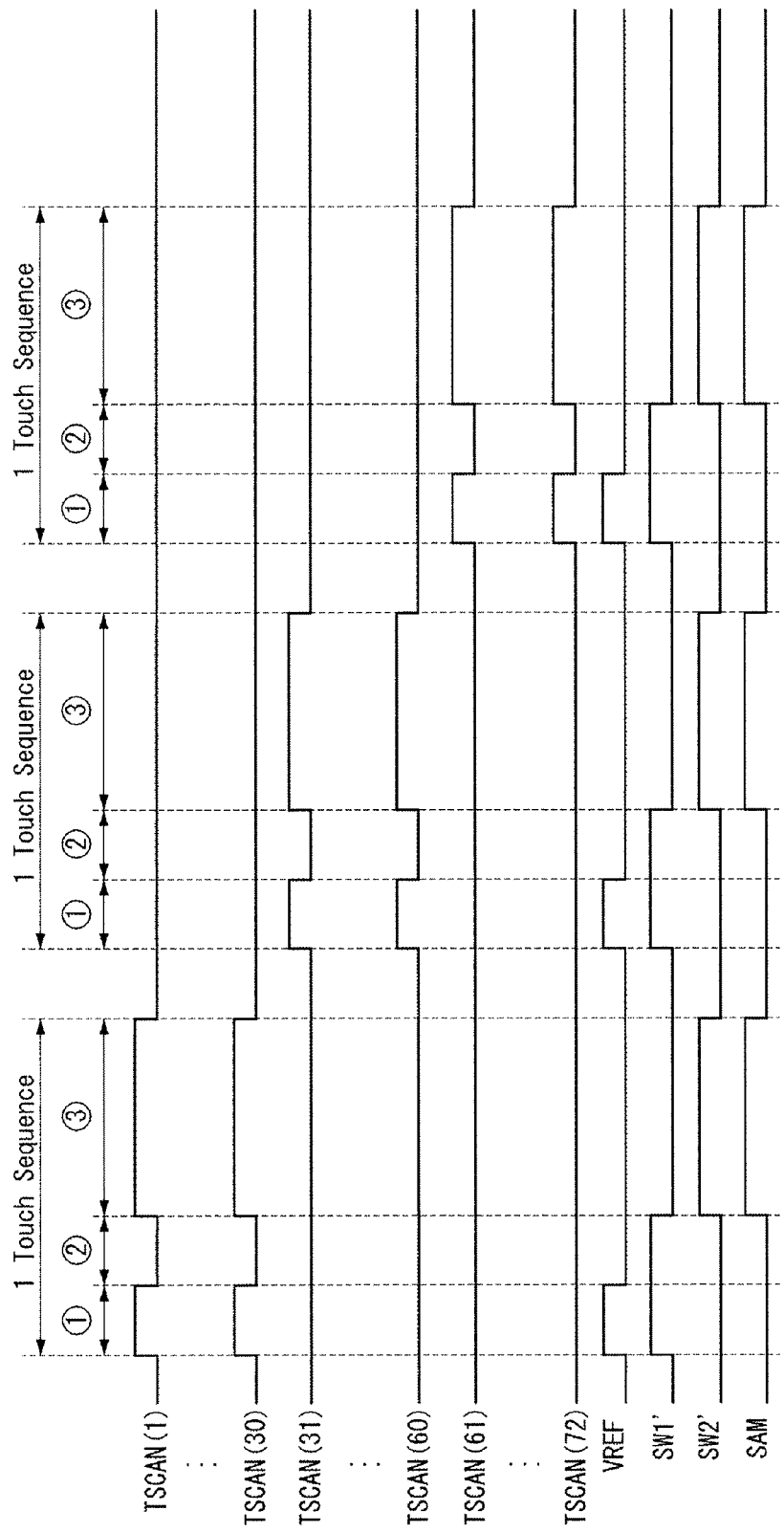
FIG. 14 is a view showing how the touch blocks of FIG. 13 are sequentially sensed in 3 touch sequences.

FIG. 13 is a view showing touch blocks and reference lines connected to them according to the second exemplary embodiment of the present invention. FIG. 14 is a view showing how the touch blocks of FIG. 13 are sequentially sensed in 3 touch sequences.

Referring to FIG. 13, for a UHD (ultra-high definition) resolution, the number of data lines 14 is 15,360 (3840×4 (RWGB)) which is the horizontal resolution, and the number of image scan lines is 2,160 which is the vertical resolution. If one pixel unit UPXL shares a single reference line 15, the number of reference lines 15 is 3,840.

In this case, if the size of 1 touch block BLK is set to 120(horizontal resolution)×30(vertical resolution) in consideration of the touch surface area of the touch input element, the number of touch blocks BLK that can be simultaneously sensed is 128×30. In this case, the touch blocks BLK can be individually connected to the touch/pixel sensing units TRSU through different reference lines 15. Thus, as shown in FIG. 14, touch inputs on all the touch blocks BLK(1,1) to BLK(128,72) can be sequentially sensed in three touch sequences within three touch frames.

In FIG. 13, each touch block BLK can have one touch pixel TP, and the number of touch/pixel sensing units TRSU can be 3,840 (30×128). The touch pixel TP in a touch block BLK(1,1) can be connected to a first touch/pixel sensing unit TRSU through a first reference line 1, the touch pixel TP in a touch block BLK(2,2) can be connected to a 32nd touch/pixel sensing unit TRSU through a 32nd reference line 32, the touch pixel TP in a touch block BLK(3,3) can be connected to a 63rd touch/pixel sensing unit TRSU through a 63rd reference line 63, and the touch pixel TP in a touch block BLK(128,30) can be connected to a 3840th touch/pixel sensing unit TRSU through a 3840th reference line 3840. In this instance, the touch pixel TP in the touch block BLK(1,1) can be connected to a first touch scan line 1, the touch pixel TP in the touch block BLK(2,2) can be connected to a second touch scan line 2, the touch pixel TP in the touch block BLK(3,3) can be connected to a third touch scan line 3, and the touch pixel TP in the touch block BLK(128,30) can be connected to a 30th touch scan line 30.

By using the reference lines as the touch sensing lines, there is no need to add sensor lines for touch sensing, and the existing pixel array and sensing circuit for external compensation can be used for touch sensing without substantially altering them. This can minimize the increase in manufacturing costs for touch sensing.

Period of Time Allocated for Touch Sequence

Figure 15:
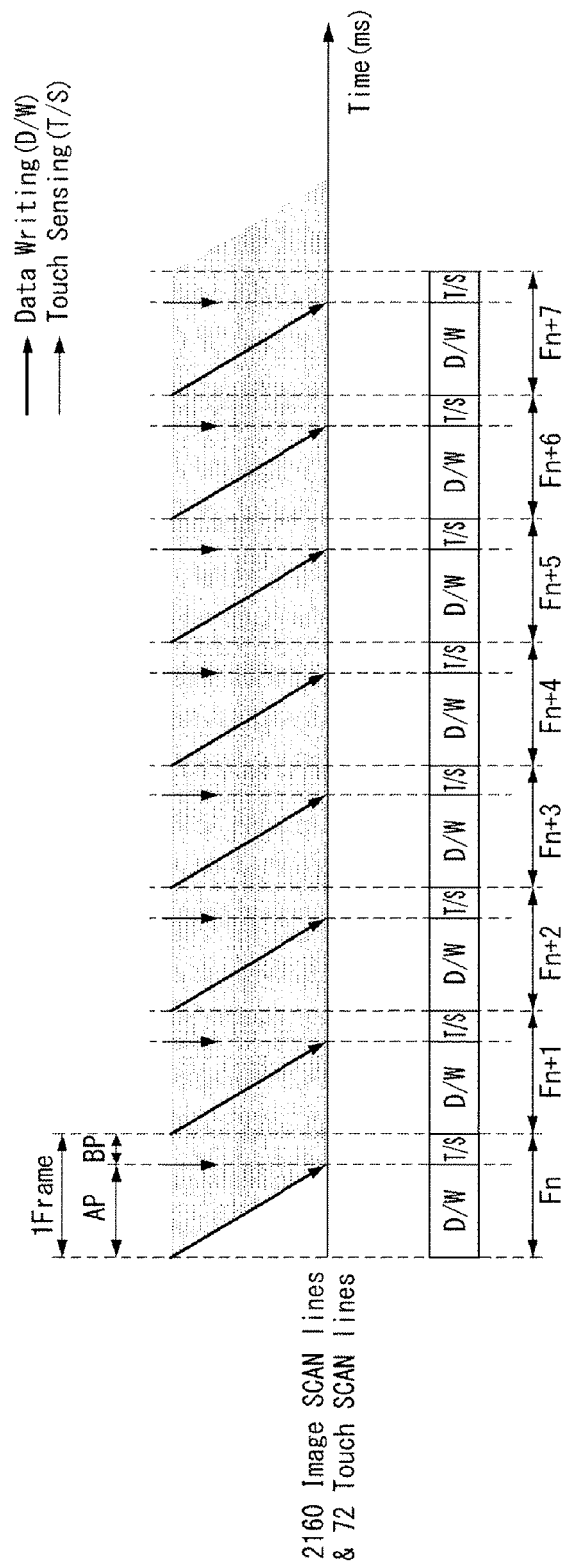
FIG. 15 is a view showing how a touch sequence occurs during a vertical blanking period according to an example of the present invention.
Figure 16:
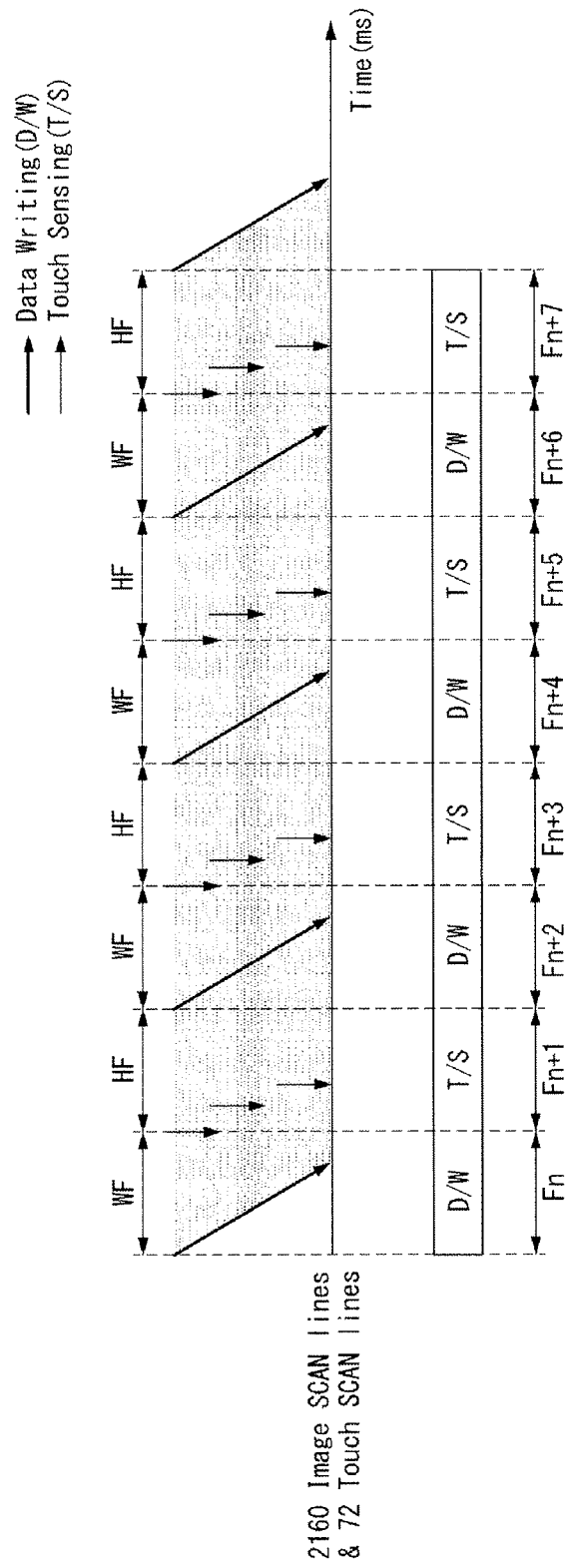
FIG. 16 is a view showing how a touch sequence occurs during a holding image frame according to an example of the present invention.

FIG. 15 is a view showing how a touch sequence occurs during a vertical blanking period according to an example of the present invention. FIG. 16 is a view showing how a touch sequence occurs during a holding image frame according to an example of the present invention.

Referring to FIG. 15, if one image frame comprises a vertical active period AP for writing image data to the pixels to display an input image, and a vertical blanking period BP during which no image data is written and which is shorter than the vertical active period AP, a touch sequence can occur during the vertical blanking period BP.

If the image frame frequency is 120 Hz at UHD resolution, each image frame can have a vertical blanking period BP of 0.3 msec. In the case of touch sensing using data lines, it takes about 0.12 msec to complete 1 touch frame, and therefore touch inputs on all the touch blocks can be sensed during 1 vertical blanking period BP. In the case of touch sensing using reference lines, it takes about 0.36 msec to complete 1 touch frame, and therefore touch inputs on all the touch blocks can be sensed in a segmented manner during 2 vertical blanking periods BP.

Meanwhile, after the touch sequence is finished, an external compensation sensing operation can be performed during the remaining time of the vertical blanking period BP.

Referring to FIG. 16, if at least one holding image frame HF during which no image data is written is positioned between two writing image frames WF for writing image data to the pixels to display an input image, a touch sequence can occur during the holding image frame HF.

FIG. 16 shows that sufficient time can be allocated for a touch sequence, and that sensing performance can be improved through repeating touch sequences. Moreover, after the touch sequence is finished, an external compensation sensing operation can be performed during the remaining time of the holding image frame HF.

A Solution for Increasing Touch Capacitance

Touch performance depends on the capacitance of a touch capacitor. The higher the touch capacitance, the more distinct a touch and non-touch on touch pixels are from each other. The embodiments of the present invention propose a solution for increasing touch capacitance using an auxiliary electrode in order to improve touch performance.

Figure 17:
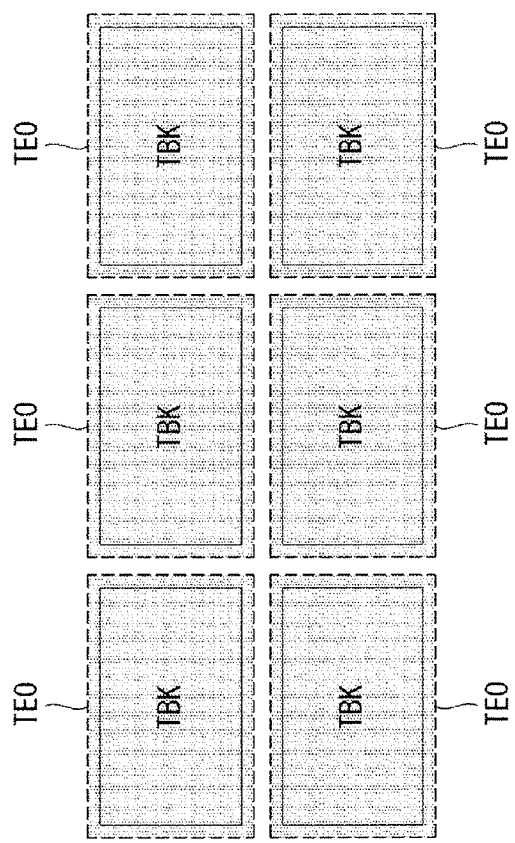
FIG. 17 is a view showing an auxiliary electrode that is patterned on a per-touch block basis to improve touch performance according to an example of the present invention.
Figure 18:
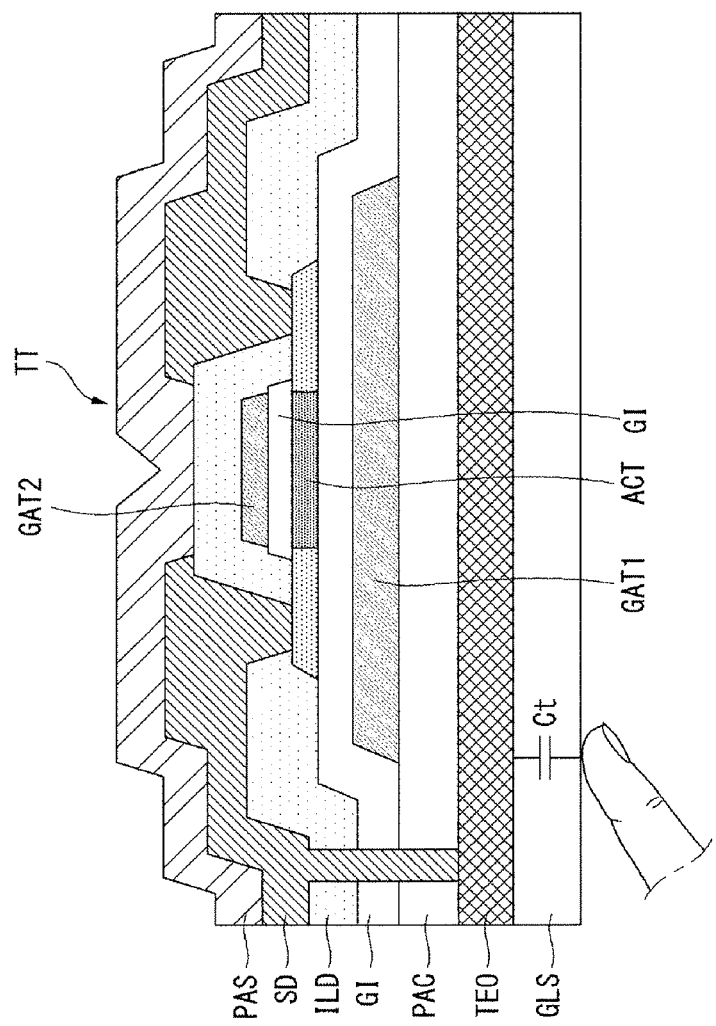
FIG. 18 is a view showing a cross-sectional structure of a touch TFT whose first or second electrode makes contact with the auxiliary electrode according to an example of the present invention.

FIG. 17 is a view showing an auxiliary electrode that is patterned on a per-touch block basis to improve touch performance according to an example of the present invention. FIG. 18 is a view showing a cross-sectional structure of a touch TFT whose first or second electrode makes contact with the auxiliary electrode according to an example of the present invention.

Referring to FIGS. 17 and 18, the display panel of this invention further comprises an auxiliary electrode TEO to improve touch sensitivity. The auxiliary electrode TEO can be patterned on a per-touch block TBK basis and make contact with the touch pixel.

Specifically, the auxiliary electrode TEO can make contact with one electrode SD of the touch TFT TT included in the touch pixel via a contact hole formed through at least one insulating layer PAC, GI, and ILD. In this case, when there is a touch input, a touch capacitor Ct can be formed between the auxiliary electrode TEO and a touch input element (e.g., a finger) by using a substrate GLS as a dielectric material. The capacitance of the touch capacitor Ct can be increased due to the auxiliary electrode TEO, and the touch performance can be improved as much.

In FIG. 18, GLS denotes the substrate, ACT denotes an active layer of the touch TFT TT, GAT1 and GAT2 denote the gate electrode of the touch TFT TT, SD denotes the source electrode (or drain electrode) of the driving TFT, and GI, ILD, ESL, and PAS denote insulating layers.

A Solution for Overcoming a Difference in Aperture Ratio Caused by Touch Pixels

Figure 19:
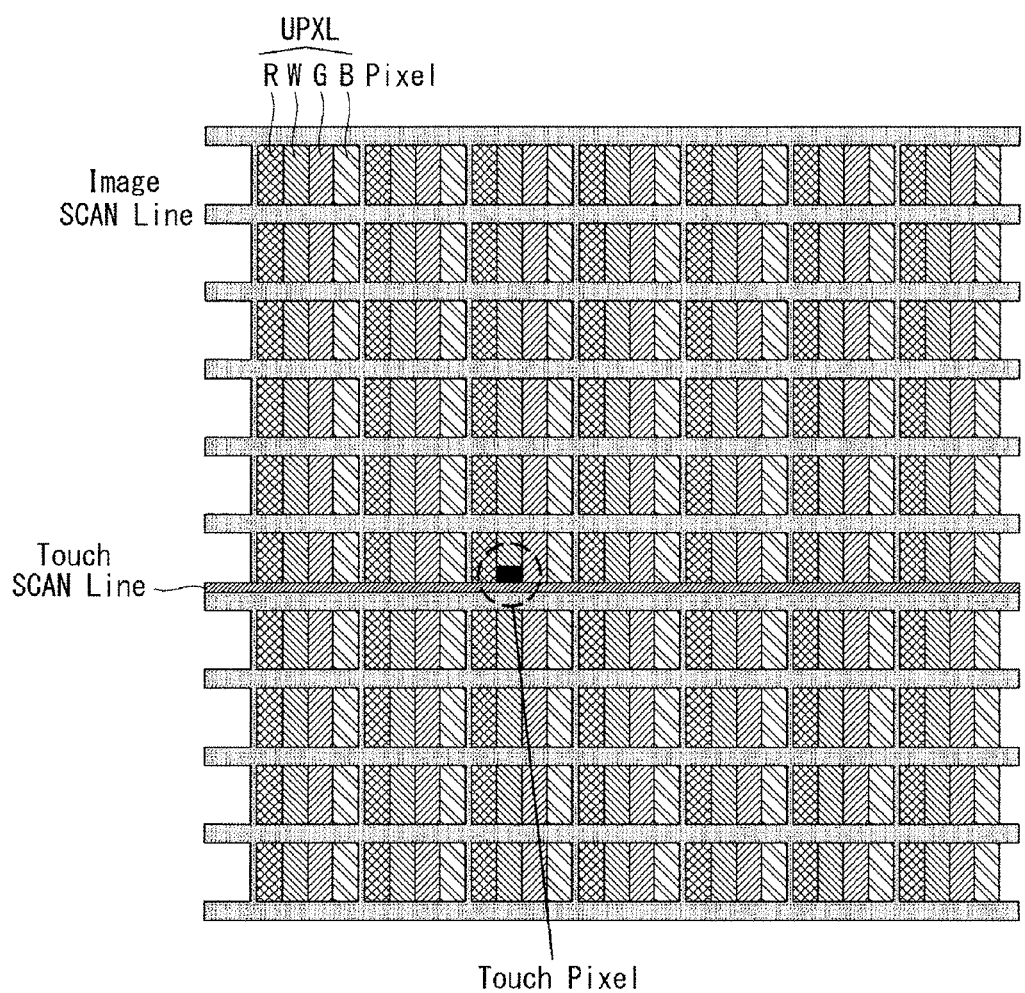
FIG. 19 is a view showing a touch pixel and a touch scan line connected to it and pixel units and image scan lines connected to them according to an example of the present invention.
Figure 20:
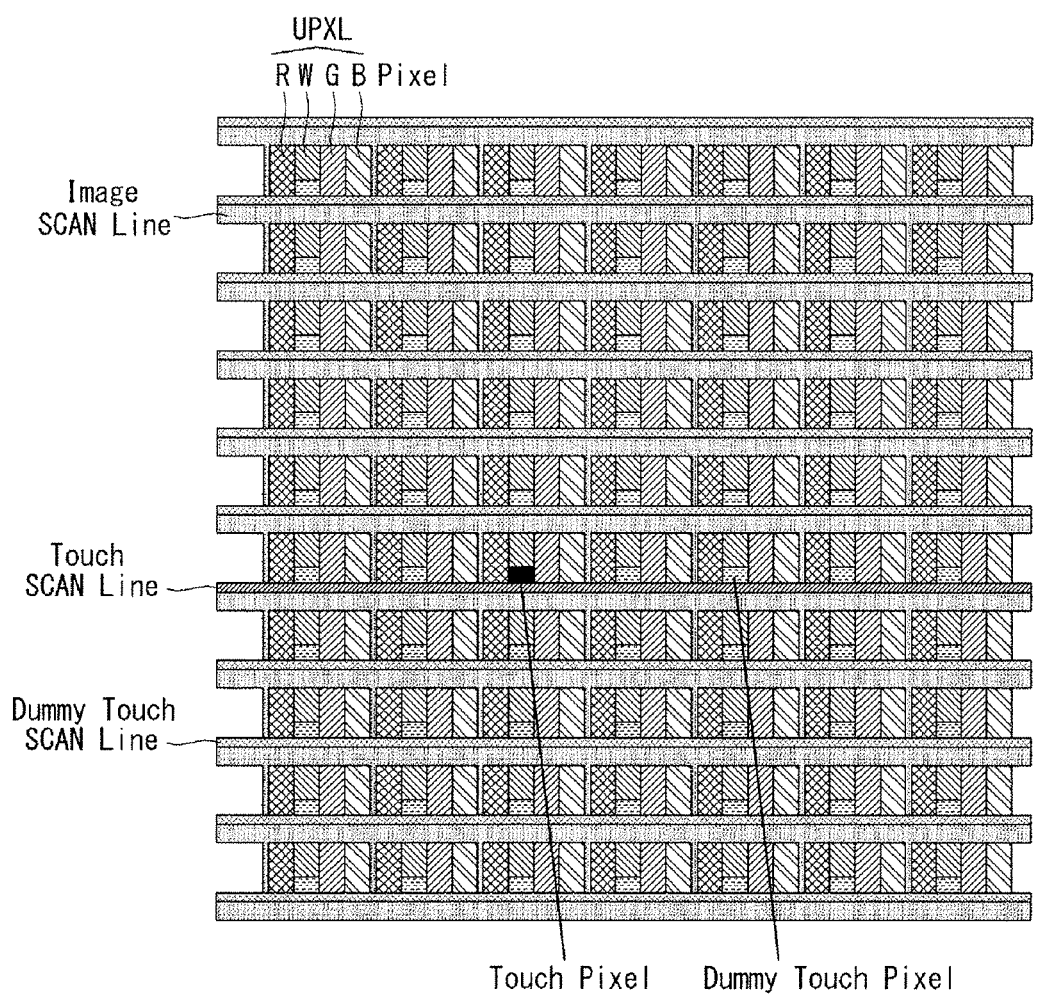
FIG. 20 is a view showing a touch pixel and a touch scan line connected to it, pixel units and image scan lines connected to them, and dummy touch pixels and dummy touch scan lines connected to them according to an example of the present invention.

FIG. 19 is a view showing a touch pixel and a touch scan line connected to it and pixel units and image scan lines connected to them according to an example of the present invention. FIG. 20 is a view showing a touch pixel and a touch scan line connected to it, pixel units and image scan lines connected to them, and dummy touch pixels and dummy touch scan lines connected to them according to an example of the present invention.

As shown in FIG. 19, each touch block requires at least one touch pixel and at least one touch scan line. Due to the touch pixel and the touch scan line, a particular pixel unit in each touch block and a particular pixel line containing it can have a lower aperture ratio. This lower aperture ratio can lead to brightness variation.

To solve this problem, the timing controller of this invention can up-modulate image data applied to a particular pixel unit corresponding to a touch pixel, and also can up-modulate image data applied to pixel units corresponding to a particular pixel line.

In another method, as shown in FIG. 20, in each touch block, dummy touch pixels can be placed to correspond to the other pixel units, other than the particular pixel unit, and dummy touch scan lines can be placed to correspond to the other pixel lines, other than the particular pixel line, so that all the pixel units and all the pixel lines have the same aperture ratio. By using some of the dummy touch pixels as touch pixels, the present invention can improve touch sensitivity or replace erroneous pixels with dummy touch pixels.

As described above, the touch sensor-integrated display device according to the embodiments of this invention uses no complicated touch electrodes or sensor lines and minimizes additional elements for touch sensing, since touch input is sensed by using a pixel array and sensing circuit for external compensation.

Through the above description, those skilled in the art will appreciate that various modifications and changes are possible, without departing from the scope and spirit of the invention. Therefore, the technical scope of the present invention should be defined by the appended claims rather than the detailed description of the specification.

What is claimed is:

1. A touch sensor-integrated display device comprising:
   a display panel with a pixel array divided into a plurality of touch blocks, each touch block having a plurality of pixels for displaying an input image and a self-capacitance type touch pixel for sensing a touch input;
   a data drive circuit that applies a charging voltage to a touch capacitor formed in response to a touch connected to the self-capacitance type touch pixel in each touch block through a touch sensing line and senses an electrical charge discharged from the touch capacitor and outputs a sensed result as a touch sensing value,
   wherein the touch sensing line is implemented by a plurality of reference lines which are commonly connected to the pixels and the self-capacitance type touch pixel in each touch block, each of the plurality of reference lines being configured as an external compensation sensing line for sensing driving characteristics of a corresponding pixel among the plurality of pixels;
   a gate drive circuit that generates a touch scan signal for driving the self-capacitance type touch pixels of the touch blocks and supplies the touch scan signal to touch scan lines connected to the touch pixels of the touch blocks; and
   a timing controller that detects the touch input based on the touch sensing value,
   wherein the self-capacitance type touch pixel in each touch block comprises a touch thin-film transistor (TFT) having a gate electrode connected to one of the touch scan lines, a first electrode connected to the touch sensing line, and a second electrode,
   wherein each of the plurality of pixels in each touch block comprises a driving TFT configured to generate a pixel current according to a data voltage, and an organic light emitting diode configured to emit light according to the pixel current,
   wherein the self-capacitance type touch pixel in each touch block does not include the driving TFT and the organic light emitting diode,
   wherein the display panel further comprises an auxiliary electrode that is patterned on a per-touch block basis and connected to the second electrode of the touch TFT in each touch block, and
   wherein a pattern size of the auxiliary electrode is larger than an area of the corresponding touch block.

2. The touch sensor-integrated display device of claim 1, wherein the capacitor circuit includes a parasitic capacitor configured to be affected by a touch capacitor formed by the touch input.

3. The touch sensor-integrated display device of claim 2, wherein the parasitic capacitor is connected between the second electrode of the touch TFT and a ground electrode for supplying a common voltage to the pixels, and
   wherein the touch capacitor is formed between the second electrode of the touch TFT and a touch input element.

4. The touch sensor-integrated display device of claim 3, wherein the charging voltage is stored in the touch capacitor and the parasitic capacitor of the self-capacitance type touch pixel in a first touch block to which the touch input is applied, and the charging voltage is stored in the parasitic capacitor of the self-capacitance type touch pixel in a second touch block to which no touch input is applied.

5. The touch sensor-integrated display device of claim 4, wherein a quantity of electric charge discharged from the self-capacitance type touch pixel in the first touch block is greater than a quantity of electric charge discharged from the self-capacitance type touch pixel in the second touch block.

6. The touch sensor-integrated display device of claim 1, wherein the data drive circuit comprises:
   a plurality of reference channel terminals connected to the reference lines;
   a plurality of digital-to-analog converters that generate the charging voltage to be supplied to the reference channel terminals,
   a plurality of touch/pixel sensing units that receive an electrical charge discharged from the self-capacitance type touch pixels through the reference channel terminals and output a touch sensing value;
   first reference switches connected between the reference channel terminals and the digital-to-analog converters; and
   second reference switches connected between the reference channel terminals and the touch/pixel sensing units.

7. The touch sensor-integrated display device of claim 6, wherein the touch/pixel sensing units sense a pixel current fed through the reference lines and the reference channel terminals, in accordance with the driving characteristics of the pixels.

8. The touch sensor-integrated display device of claim 6, wherein the timing controller allocates at least one touch sequence within one touch frame, and
   wherein the one touch frame is defined as the time required to sense all touch inputs on the touch blocks.

9. The touch sensor-integrated display device of claim 8, wherein the at least one touch sequence comprises:
   a first period for applying a charging voltage to the self-capacitance type touch pixel in each touch block;
   a second period for resetting the touch sensing line, which occurs subsequent to the first period; and
   a third period for sensing an electrical charge discharged from the self-capacitance type touch pixel in each touch block, which occurs subsequent to the second period.

10. The touch sensor-integrated display device of claim 9, wherein, if one image frame comprises a vertical active period for writing image data to the pixels to display an input image, and a vertical blanking period during which no image data is written and which is shorter than the vertical active period, the at least one touch sequence occurs during the vertical blanking period.

11. The touch sensor-integrated display device of claim 9, wherein at least one holding image frame during which no image data is written is positioned between two writing image frames for writing image data to the pixels to display an input image, and wherein the at least one touch sequence occurs during the holding image frame.

12. The touch sensor-integrated display device of claim 1, wherein the auxiliary electrode makes contact with the second electrode of the touch TFT included in the self-capacitance type touch pixel via a contact hole formed through at least one insulating layer and, when there is a touch input, a touch capacitor is formed between the auxiliary electrode and a touch input element by using a substrate as a dielectric material.

13. The touch sensor-integrated display device of claim 1, wherein a plurality of pixel units are arranged in each touch block, and the self-capacitance type touch pixel in each touch block is positioned to correspond to at least one first pixel unit.

14. The touch sensor-integrated display device of claim 13, wherein, in each touch block, dummy touch pixels are placed to correspond to a second pixel unit so that the first and second pixel units have the same aperture ratio.

15. The touch sensor-integrated display device of claim 2, wherein the parasitic capacitor is formed between the second electrode of the touch TFT and ground terminal.

16. The touch sensor-integrated display device of claim 1, wherein the auxiliary electrode is configured to form a touch capacitor between the second electrode of the touch TFT and ground terminal and a finger of a user.

* * * * *